(12) United States Patent
Oberhofer et al.

(10) Patent No.: US 6,735,921 B2
(45) Date of Patent: May 18, 2004

(54) FASTENING DEVICE FOR FASTENING A GLASS PANEL TO A BUILDING STRUCTURE

(76) Inventors: Alfons Oberhofer, Schindlergasse 49, A-1180 Wien (AT); Lothar Ginzel, Am Hermannsbrunnen 26, 58239 Schwerte (DE)

( * ) Notice: Subject to any disclaimer, the term of this patent is extended or adjusted under 35 U.S.C. 154(b) by 11 days.

(21) Appl. No.: 09/872,161

(22) Filed: Jun. 1, 2001

(65) Prior Publication Data

US 2002/0020119 A1 Feb. 21, 2002

Related U.S. Application Data

(63) Continuation-in-part of application No. PCT/EP00/09531, filed on Sep. 29, 2000.

(30) Foreign Application Priority Data

Oct. 4, 1999 (DE) .................................. 299 17 488 0 U

(51) Int. Cl.⁷ ................................................ E04B 2/88
(52) U.S. Cl. .................. 52/786.1; 52/787.1; 52/786.13; 52/208; 52/204.7; 52/235; 403/408.1; 403/388
(58) Field of Search .......................... 52/786.1, 787.1, 52/786.13, 208, 204.593, 204.62, 204.7, 235; 403/408.1, 388, 384, 230, 244, 247; 411/537, 82

(56) References Cited

U.S. PATENT DOCUMENTS

| | | | | |
|---|---|---|---|---|
| 3,356,404 A | * | 12/1967 | Peters | 52/208 |
| 4,680,206 A | * | 7/1987 | Yoxon et al. | 52/788 |
| 4,732,519 A | * | 3/1988 | Wagner | 411/337 |
| 4,974,989 A | * | 12/1990 | Salter | 403/408.1 |
| 5,128,181 A | * | 7/1992 | Kunert | 428/34 |
| 5,138,804 A | * | 8/1992 | Roberts | 52/51 |
| 5,138,820 A | * | 8/1992 | Pearce et al. | 52/656 |
| 5,497,586 A | * | 3/1996 | Dodd et al. | 52/172 |
| 5,525,001 A | * | 6/1996 | Perkins | 403/157 |
| 5,540,514 A | * | 7/1996 | Demars et al. | 52/235 |
| 5,558,723 A | * | 9/1996 | Ufert | 136/244 |
| 6,105,319 A | * | 8/2000 | Brunt | 52/204.593 |
| 6,131,346 A | * | 10/2000 | Kordes | 52/235 |
| 6,158,177 A | * | 12/2000 | Blobaum | 52/208 |
| 6,254,397 B1 | * | 7/2001 | Elmer | 439/6 |
| 6,260,197 B1 | * | 7/2001 | Hoogewind | 2/8 |
| 6,430,894 B1 | * | 8/2002 | Chae et al. | 52/786.1 |
| 6,442,911 B2 | * | 9/2002 | Elmer et al. | 52/506.01 |

FOREIGN PATENT DOCUMENTS

| | | | | |
|---|---|---|---|---|
| DE | 19859888 | | 7/2000 | |
| EP | 0201212 | | 11/1986 | |
| EP | 0655543 | | 5/1995 | |
| FR | 2 654 452 | * | 5/1991 | 52/208 |
| WO | 9963193 | | 12/1999 | |

* cited by examiner

*Primary Examiner*—Lanna Mai
*Assistant Examiner*—Dennis L. Dorsey
(74) *Attorney, Agent, or Firm*—Nils H. Ljungman & Associates

(57) ABSTRACT

Holder for plates, in particular glass plates with borings or holes, whereby in each boring is inserted an annular body with an internal or female thread and an outside facing made of an elastic material. A threaded bolt for the connection to a load-bearing construction can be screwed into the annular body. The punctiform holder makes possible a pivoting and displacement of the glass plate within certain limits. It can be installed quickly and easily.

13 Claims, 20 Drawing Sheets

FASTENING DEVICE FOR FASTENING A GLASS PANEL TO A BUILDING STRUCTURE

CONTINUING APPLICATION DATA

This application is a Continuation-In-Part application of International Patent Application No. PCT/EP00/09531, filed on Sep. 29, 2000, which claims priority from Federal Republic of Germany Patent Application No. 299 17 488.3, filed on Oct. 4, 1999. International Patent Application No. PCT/EP00/09531 was pending as of the filing date of this application. The United States was an elected state in International Patent Application No. PCT/EP00/09531.

BACKGROUND OF THE INVENTION

1. Field of the Invention

This invention relates to a fastening device for plates, in particular glass plates, such as for facades, in particular glass facades, for buildings and other purposes.

This invention relates to a fastening device for fastening a glass panel to a wall, a building-side substructure or similar object using a clamp fitting that grips the glass panel and a holder that is supported on the clamp fitting so that it can swivel to a limited extent in three dimensions.

2. Background Information

The prior art includes holders for glass plates at a point or points that have a boring running through them in which the mobility of the glass plate relative to a support construction is made possible by means of joints or links, the center point of which lies inside the boring through the glass plate. A holder of this type is described in European Patent 0 201 212 B1, for example. The joint thereby makes possible a pivoting or rotational movement, but practically no displacement relative to the plane of the plate.

European Patent 0 655 543 B1 describes a limited pivoting capability of a plate with a hole bored through it, which capability is achieved by the fact that a biconical head of a bolt connected with the support structure is mounted so that it can move in a hollow screw inside the boring through the plate. This biconical head is mounted on the end surface between elastomer discs. This construction is comprised of a large number of parts. It is very complex and expensive to manufacture. The installation of such a holder is time-consuming and can be done from only one side of the plate.

Federal Republic of Germany Patent 198 59 888 A1 describes a system for fastening plate-shaped components that require no recesses in the plate-shaped components for the fastening of the retaining element. For this purpose, in addition to the plate-shaped components, an additional plate-shaped component is added on one side, in which additional plate-shaped component there is a recess through which a retaining element runs. The retaining element thereby sits in a partly conical and partly cylindrical boring inside the plate and a threaded pin runs through the retaining element.

A fastening device for a glass plate with a voltaic element is described in Patent Cooperation Treaty Publication WO 99/63193. In this case, the fastening device is held on a building-side bracket on one side, and on the other side, the glass plate is clamped between two clamping elements. In this device of the prior art, a union cap or coupling cap is supported with adjustable bias on the inside clamp element, whereby between the union cap and the inside clamp element, there is a permanently elastic spring element that allows a relative movement of the union cap with respect to the clamping element. An additional purpose of this device of the prior art is the realization of a plurality of three-dimensional joints between the glass plate and the building-side mounting as well as the realization of the route for the lines that carry electrical cable through the fastening device.

OBJECT OF THE INVENTION

The object of this invention is to create a fastening device in the form of punctiform holders for plates, in particular glass plates, that allows a pivoting or rotational movement and a translation movement of the glass plate within certain limits. This fastening device can also be manufactured economically and used universally, whereby it can also be used with solar modules in a manner that is aesthetically appealing. The fastening device claimed by the invention can also be installed quickly and easily, so that the total costs of facades, roofs, coverings, etc., comprising these plates can be significantly reduced. The fastening devices should be realized so that the connection to a load-bearing or support construction can be made on both sides of the plates. The phrase "both sides of the plates" is also intended to include an external fastening. Finally, the fastening device claimed by the invention includes the punctiform holders for both single glass plates and for laminated glass plates.

SUMMARY OF THE INVENTION

The invention teaches that this object can be accomplished in a fastening device for plates, in particular glass plates, to a building-side mounting, whereby the glass plates have borings or holes all the way through, characterized by the fact that inserted in each boring there is at least one metal annular body with an internal or female thread and an outside facing made of an elastic material positively and non-positively connected with the annular body, and a threaded pin for the connection to a load-bearing construction can be screwed into the annular body.

Additional developments of the teaching of the invention are described herein below in the features of the invention.

The object of the invention can be achieved on the fastening device described above in the form of a punctiform holder in that in each boring through a plate, in this case a glass plate in particular, an annular body is inserted, which annular body has an internal or female thread and an outside facing, covering, or lining made of an elastic material, which material is positively and non-positively connected with the annular body. A threaded pin for the connection to a load-bearing construction or building structure can be screwed into the annular body.

Between the annular body that is located in the boring through the plate, which annular body can be made of metal, and in particular of stainless steel, and the plate there is thus an elastic collar or cuff or an elastic ring which, when it deforms, can absorb all or substantially all of the possible movements of the plate relative to the load-bearing construction or building structure. This elastic facing body has a radial dimension that can be sized so that significant movements between the annular body and the plate can be absorbed essentially without transmitting these movements to the plate. A fastening device of this type can be capable of preserving the elasticity of the glass plates, because it does not substantially restrict the freedom of movement of the glass plates and thus can result in a neutralization of forces. The glass plate is essentially not restricted in its degrees of freedom with respect to the substructure. A fixed clamping, on the other hand, is necessarily rigid and could result in the destruction of the glass plate.

In other possible embodiments of the present invention, the annular body may be constructed of different durable materials than metal, such as plastic, preferably hard plastic.

The annular body has an axial threaded boring running all the way through it, so that the threaded bolt can be screwed in on both sides of the annular body. The elastic facing, on its inside, surrounds the annular body, and on the outside of the elastic facing, it is in contact with the interior wall of the boring that runs through the plate. Thus, the entire space between the annular body and the plate is filled with the elastic facing. As a result of this measure, different movements as described above between the annular body and the plate can be absorbed, including, in particular, pivoting or rotational movements of the plate plane relative to the axis of the annular body, a displacement of the plate plane parallel or diagonal to the axis of the annular body, and a displacement of the plate perpendicular to the axis of the annular body (e.g. thermal expansion of the plate, wind and snow loads on the plate). The punctiform holder claimed by the invention can therefore be suitable for the overhead and load-bearing attachment of plates, in particular glass plates, for example of the type used for coverings and roofs, as well as for the attachment of vertical load-bearing constructions such as glass facades or solar modules.

Further, the elastic component of the fastening device allows for compensation for different external forces, such as wind, snow, heavy rain, thermal expansion and contraction, and other environmental factors, exerted on the glass plates. The elastic component also allows for ease of construction and installation of a glass facade or other structure. The elastic can compensate for slight imperfections in construction, such that, for example, the mounting areas in a building structure do not have to be exactly or precisely measured to achieve a proper positioning of the glass plate in the facade or other arrangement. This can be especially important when arranging glass panels in relation to each other, since imperfections in the location of the holes in both the building structure and glass plates, as well as irregularly sized glass panels, can make the forming of a facade very difficult without precise measuring and drilling of the holes, cutting of the glass, etc. The elastic component can allow for minor adjustment to compensate for these imperfections in construction, thus making it easier and less expensive to build the facade or other arrangement.

In the preferred realization of the punctiform holder fastening device, a nut that is engaged beyond the boring can be screwed onto the threaded pin. Between the nut and the edge of the plate hole there is a ring made of elastic material. By means of this ring, which is separate from the actual facing ring inside the boring, there is increased security in the movable mounting of the plate on the load-bearing structure.

In the preferred embodiment of the punctiform holder claimed by the invention, on the outside of the annular body there is at least one projection that is embedded in the facing. This projection increases the contact surface between the annular body and its elastic facing body and improves the transmission of forces from the plate to the annular body during the various possible relative movements that can occur in actual practice between the plate and the annular body or the load-bearing structure. The projection can extend axially symmetrically over the entire periphery of the annular body. However, it can also comprise a plurality of partial projections that are distributed in the shape of a star, for example, or in the form of teeth, indentations, prongs, or similar objects that are embedded in the facing body. In the preferred embodiment, an oval ring-shaped projection is located on the annular body. This projection can be advantageously surrounded on all sides by the elastic facings material. The oval ring-shaped projection can be realized so that it is asymmetrical with reference to the radial plane that runs through its tip circle. This projection can also be located on the outside of the annular body in the center, and namely so that it is farther from the end surface of the ring-shaped body that is closer to the above mentioned nut than from the end surface that is farther from the nut.

The outside of the ring-shaped body preferably has an outer cylindrical area and an inside cylindrical area, between which there is at least one projection.

In the preferred embodiment of the punctiform holder, the boring that runs through the plate is at least partly tapered. The contact surface between the inside of the boring and the elastomer facing body is thereby increased and the connection between the plate and the metal annular body is strengthened. The largest outside diameter of the annular body (e.g. on the tip circle of its projecting portion or portions) is larger than the smallest diameter of the boring through the plate. Thus the exit or loss of the ring-shaped body on the narrow side of the boring is essentially prevented, even in the event of a separation of the elastomer facing body from the annular body. In that case, the annular body can be held axially in the hole bored through the plate simply by the above mentioned nut that is screwed onto the threaded bolt screwed onto the annular body. The boring through the plate and the outside of the facing thereby preferably have a cylindrical-conical-cylindrical profile. The above mentioned nut is also supported on the narrow or tapered side of the boring through the plate and/or on the annular body.

In the preferred realization of the punctiform holder claimed by the invention, the elastic facing can be vulcanized onto the annular body. The rubber-metal ring is a prefabricated part. In general, the outer profile of the rubber-metal ring corresponds to the profile of the hole bored through the plate. The plates to be installed can be provided with the properly profiled borings at the factory and can be sold with the rubber-metal ring already inserted. The rubber facing appropriately has a shore hardness that is appropriate to the application. It is also possible to install the rubber-metal ring inside the boring in the plate to essentially prevent any accidental detachment during transport.

The annular body is preferably surrounded by the external facing only on its outside periphery, so that the annular body, viewed in the axial direction, ends or ends flush with the facing and is thus essentially free of the facing. This invention also extends to a punctiform holder for laminated glass plates comprising an internal and an external glass plate that are connected by a plastic film or a layer of synthetic resin located between them, wherein the punctiform holder extends only through the inner glass plate or through the inner and the outer glass plate. The punctiform holder claimed by the invention for laminated glass plates comes essentially with the same annular body with the elastic facing as for single glass plates, which can also be realized in the form of single-pane safety glass, while in the constructions of the prior art, the laminated glass plate requires a more complicated (multi-part) construction than the single glass plate.

On the punctiform holder for laminated glass plates, the elastic facing appropriately can have a recess on the outside into which a cover plate can be inserted. This metal plate covers the annular body with the elastomer facing and the threaded bolt and improves the visual appearance from the visible side (e.g. when the holder is used on a glass facade).

In addition to the recess for the cover plate, the annular body stands back with respect to the facing in the axial direction inside the inner plate. This arrangement ensures that when there is a movement of the plate or of the fastening device, the annular body does not come in contact with the outer plate. With very thick glass plates, a plurality of annular bodies, all of which are surrounded by an external facing, form a fastening device inside the glass.

As discussed above, the bolt or pin can be screwed into the annular body. However, other types of connections could be employed to connect the bolt and the annular body. For example, the bolt could be welded or affixed using some type of adhesive to the annular body. A friction fit could be used. In addition, other connectors such as snap-in connections or spline and shoulder arrangements could be used. It is to be understood that other types of known manners of connection could be used but will not be discussed any further herein.

The above-discussed embodiments of the present invention will be described further herein below. When the word "invention" is used in this specification, the word "invention" includes "inventions", that is the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

A number of exemplary embodiments are explained in greater detail below and are illustrated schematically in the accompanying drawings, in which.

DESCRIPTION OF THE PREFERRED EMBODIMENT

Figure 1:
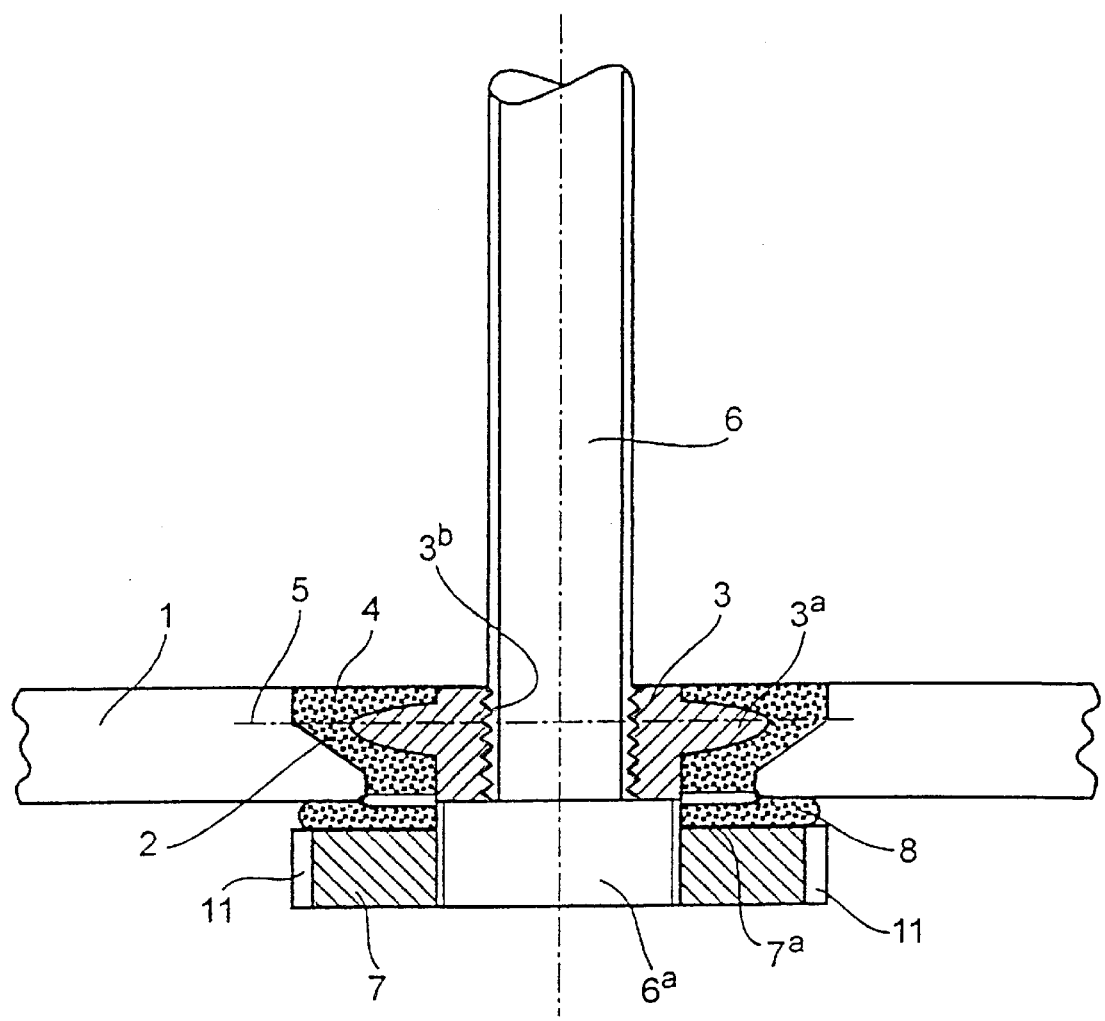
FIG. 1A shows a similar embodiment as in FIG. 1, with a modified lock nut.

FIG. 1 shows a glass plate 1 with a cylindrical-conical-cylindrical boring 2 through it, into which an annular body 3 is inserted, vulcanized onto the outside of which annular body is a rubber facing 4. The annular body 3 and the facing 4 are thereby positively and non-positively connected together to form a unit. As shown in the figure, the metal annular body 3 has, on the outside, an oval ring-shaped projection 3a shown in cross section, which has over its entire periphery the cross section illustrated in FIG. 1. The projection 3a is asymmetrical with reference to a radial plane 5. The annular body 3 has, on the inside, a threaded boring 3b into which a threaded bolt 6 is screwed. The threaded bolt 6 extends through the annular body 3 and is in contact by means of its head 6a, which carries a male or external thread, against the outside of the annular body 3. Screwed onto the head 6a is a nut 7, the outside diameter of which is larger than the inside diameter of the boring 2 on the outside of the glass plate 1. Between an outside 7a of the nut 7 and the glass plate 1, there is a ring 8 made of an elastic material similar to the facing 4. This elastic ring 8 can be vulcanized onto one end surface of the nut 7 analogous to the vulcanized rubber facing 4.

Figure 2:
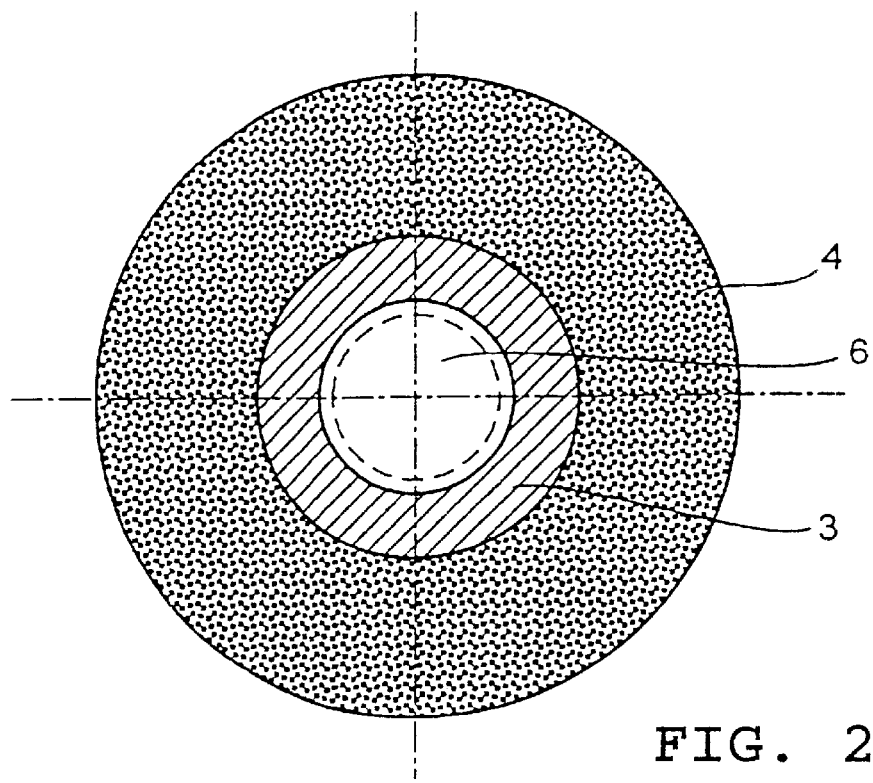
FIG. 2 shows an overhead view of the punctiform holder illustrated in FIG. 1.
Figure 3:
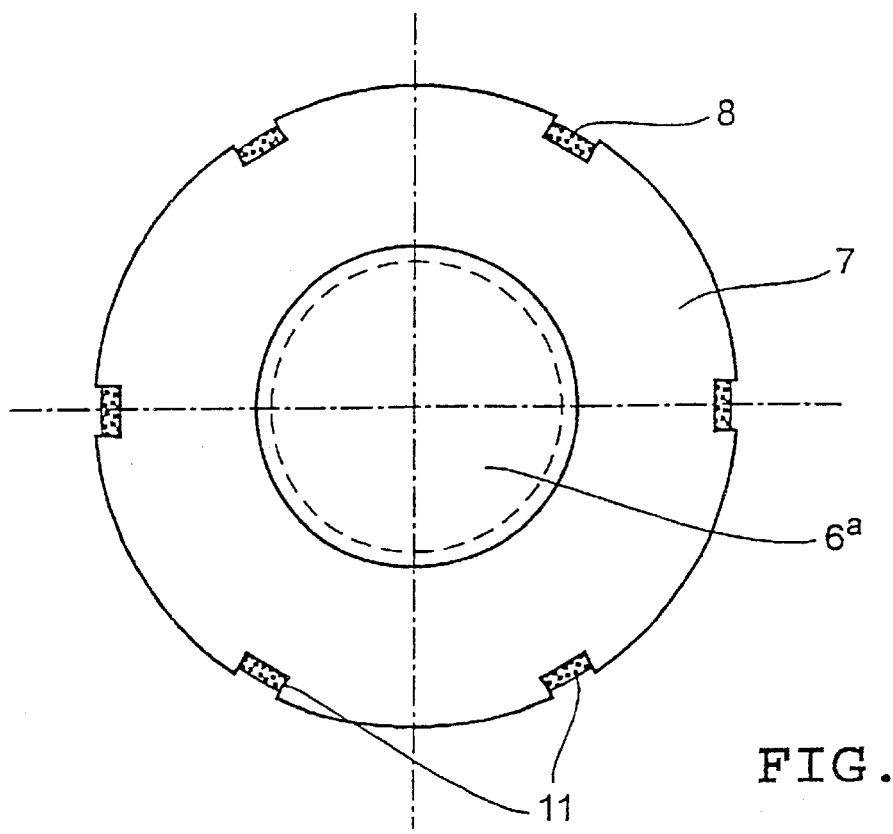
FIG. 3 shows a bottom view of the punctiform holder illustrated in FIG. 1.

As shown in FIG. 3, the nut 7, on the periphery, has recesses 11 for the engagement of an installation wrench. The end surfaces of the annular body 3 and of the rubber facing 4 terminate flush with the outside or inside of the glass plate 1 (FIG. 1). The rubber-metal bodies 3, 4 can therefore be inserted into the boring 2 without interfering with the stacking or transport of the glass plates 1. The overhead view of the punctiform holder illustrated in FIG. 2 shows clearly that in the center area, the annular body 3 is not covered by the facing 4. The embodiment illustrated in FIGS. 1 to 3 is suitable for a suspended or overhead attachment, e.g. for ceilings or facades.

Figure 4:
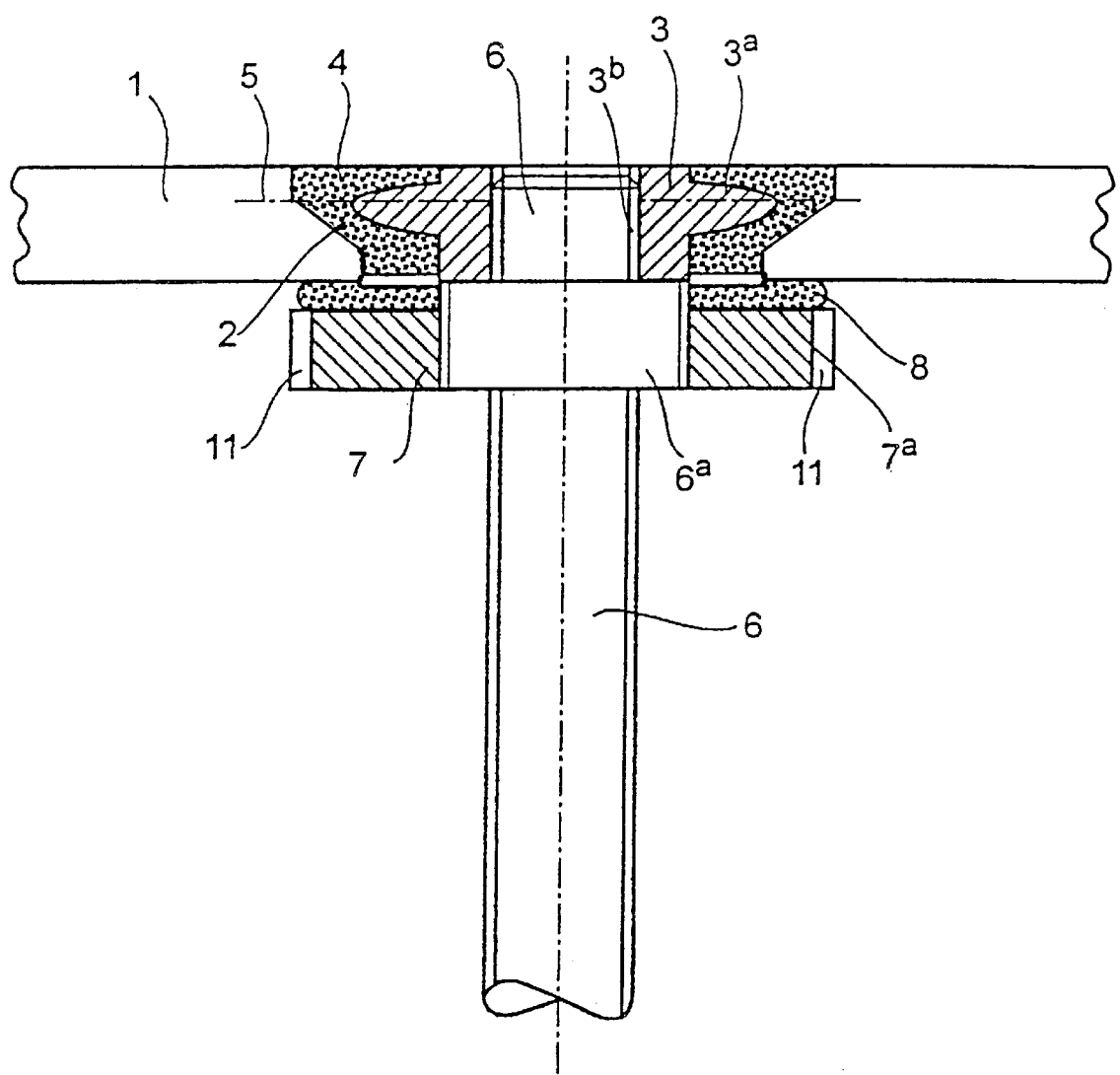
FIG. 4 shows an axial section through the punctiform holder illustrated in FIG. 1, but with an internal fastening attachment.
Figure 5:
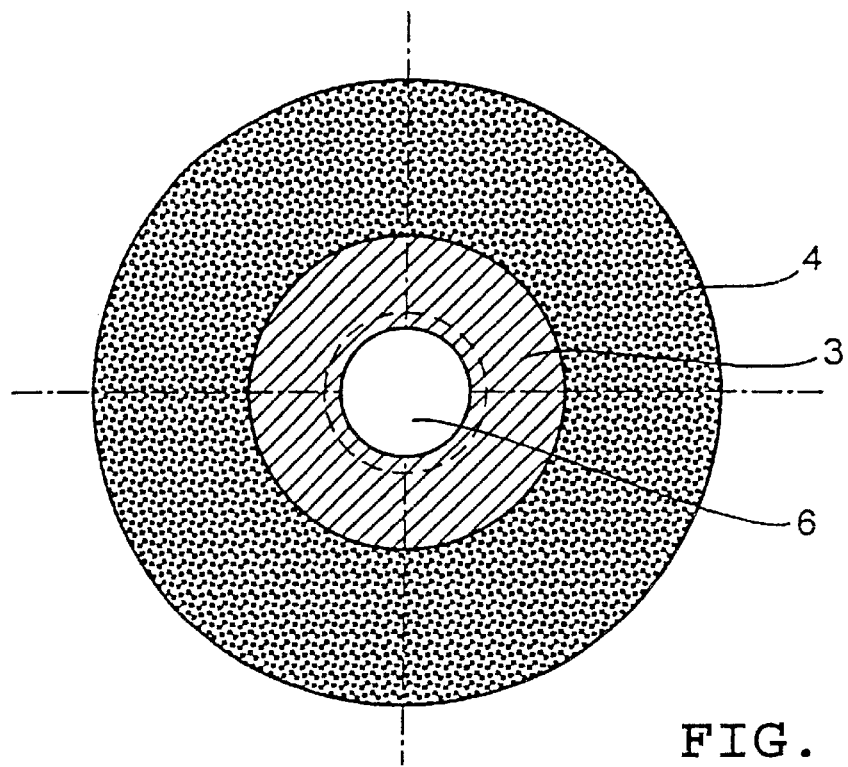
FIG. 5 shows an overhead view of a punctiform holder as illustrated in FIG. 4.
Figure 6:
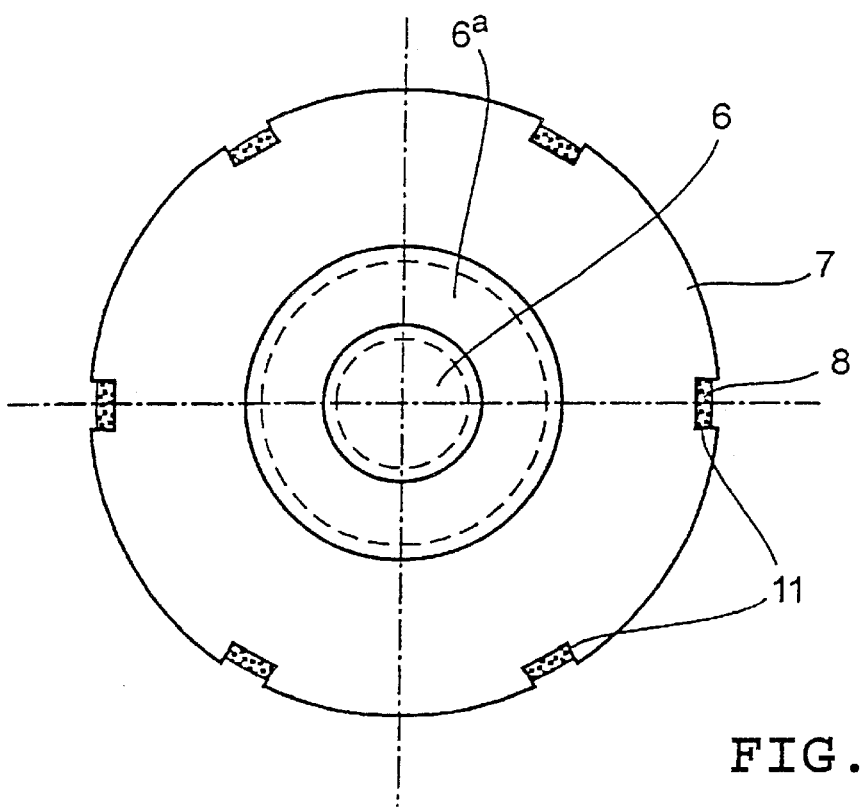
FIG. 6 shows a view from underneath of the punctiform holder illustrated in FIG. 4.

FIGS. 4 to 6 show the same punctiform holder as in FIGS. 1 to 3. Using the punctiform holder claimed by the invention, the glass plate 1 can be installed on either side. The punctiform holder system taught by the invention therefore keeps the number of parts that have to be kept in inventory low. In this exemplary embodiment, the head 6a is realized in the form of a separate nut, which on one hand is screwed into the nut 7 and on the other hand is penetrated by the screwed-in threaded bolt 6. However, it is also possible in this case to use a modified threaded bolt 6, on which the head 6*a* does not lie on the end, but is offset by a reduced dimension of or by a dimension smaller than the thickness of the annular body 3. On this extension, there is therefore a thread that is engaged in the threaded boring 3*b*.

Figure 1A:
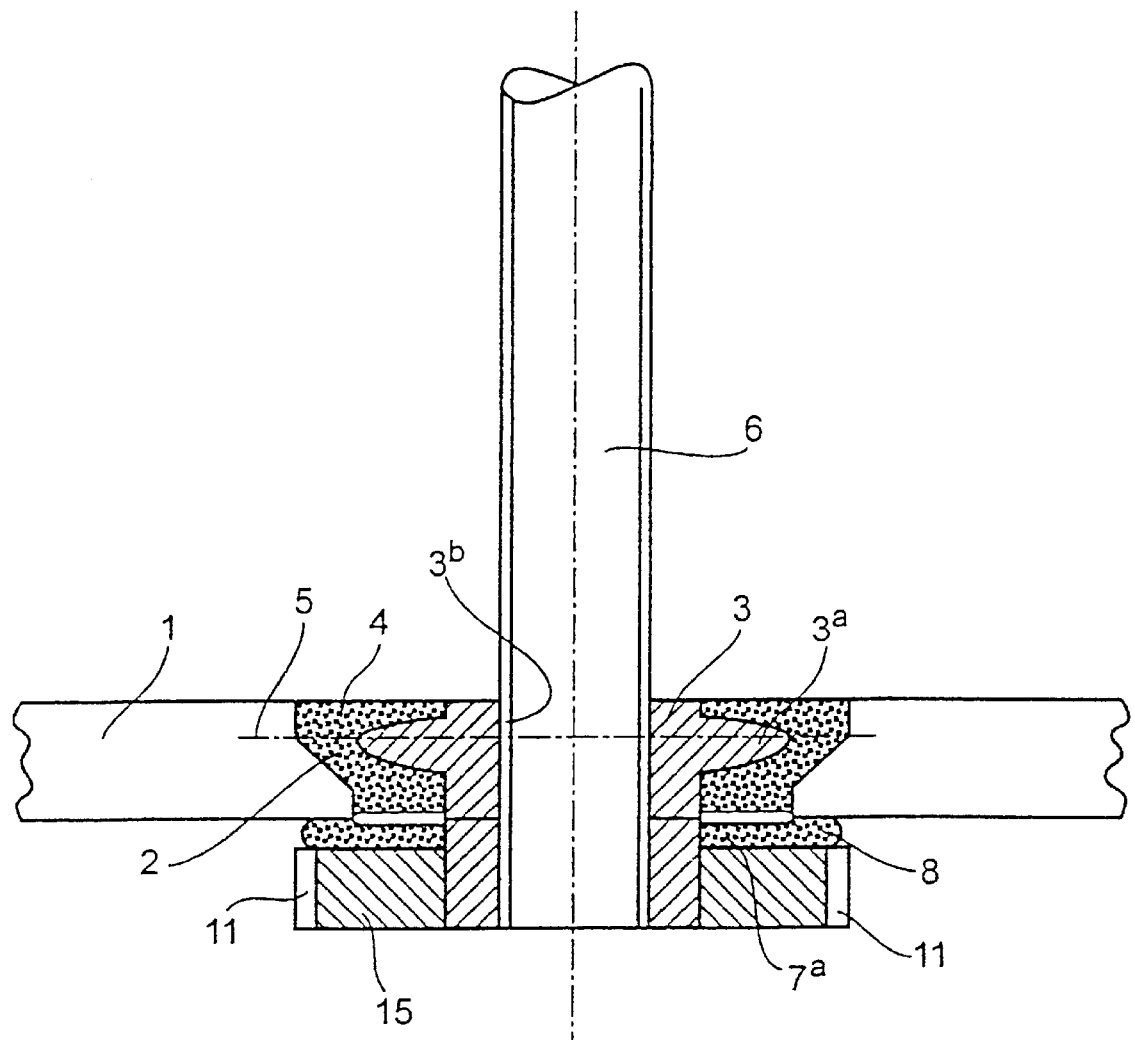

FIG. 1A shows a modified nut 15. The external geometric configuration of the nut 15 is analogous to that of the nut 7. In this case, the threaded bolt 6 is engaged with its thread in a thread of the nut 15, whereby in the vicinity of the female or internal thread of the nut 15, this area is realized so that it has a greater thickness than the nut 15 itself. This shoulder ensures that the ring 8 can spread out or expand from the elastic material to the surface of the nut 15. The diameter of the interior area of the nut 15 with its thread is coordinated to the same, equivalent, or matching diameter of the annular body 3 which is not covered by the facing 4. In this case, therefore, the metal materials come together when the nut is tightened on the threaded bolt 6 with the annular body 3. At the same time, this arrangement ensures that when there is a movement both of the glass plate 1 and of the fastening device, the outer edges of the nut 15 will not come in contact with the surface of the glass plate 1.

Figure 4A:
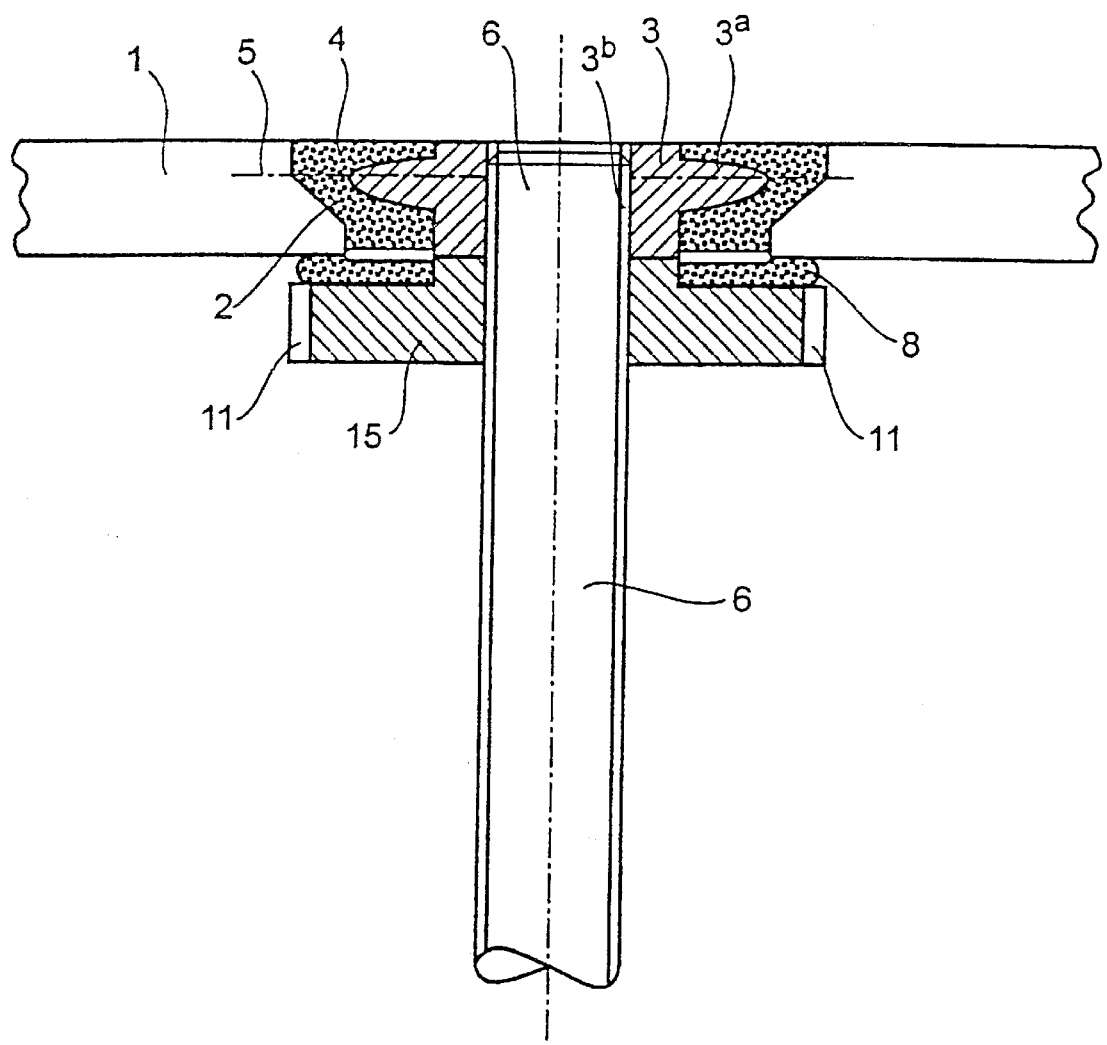
FIG. 4A shows a similar embodiment as FIG. 4, with a modified lock nut.

The nut illustrated in FIG. 4A is used in the same manner as the nut illustrated in FIG. 1A, except that it is installed on the other side.

FIG. 5 shows an overhead view of a punctiform holder as illustrated in FIG. 4.

FIG. 6 shows a view from underneath of the punctiform holder illustrated in FIG. 4.

Figure 7:
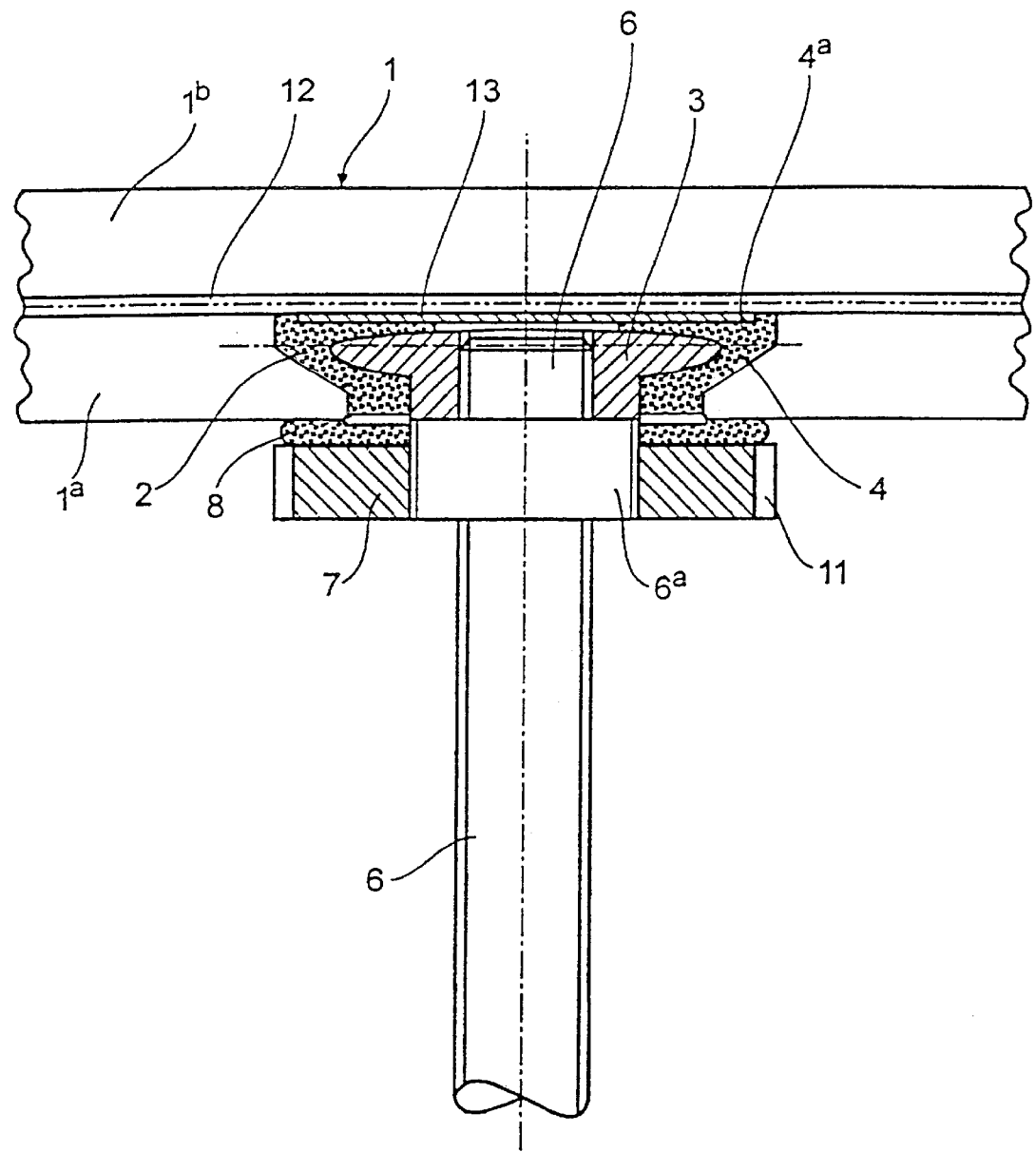
FIG. 7 shows an axial section of a punctiform holder in a laminated glass plate.
Figure 9:
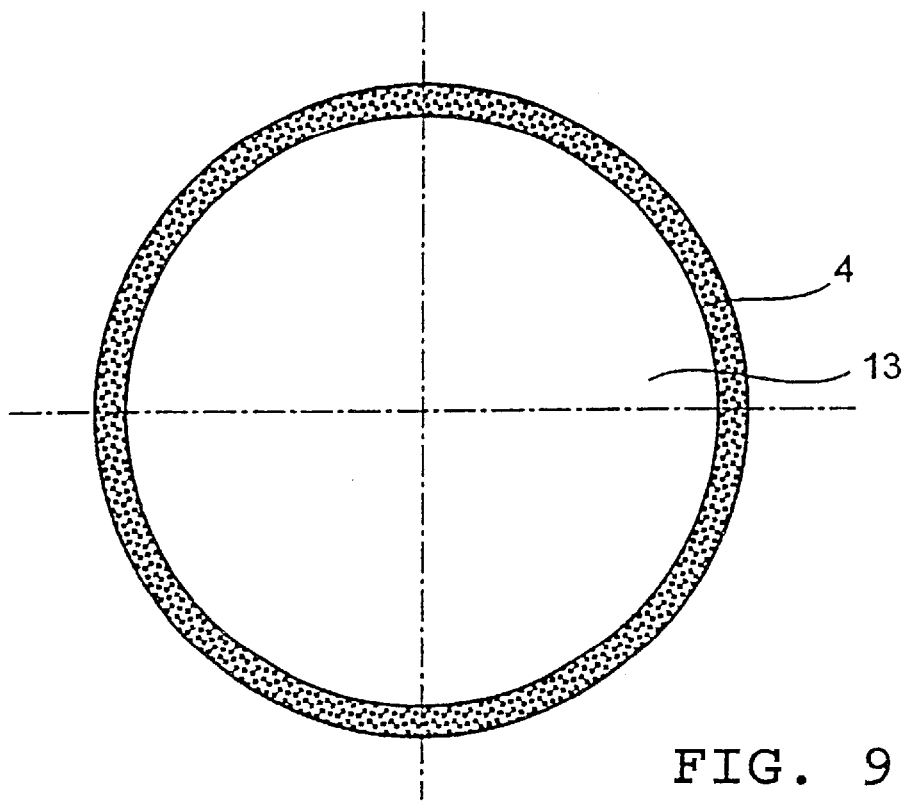
FIG. 9 shows an overhead view of the punctiform holder illustrated in FIG. 7.

FIG. 7 shows a glass plate 1 which is illustrated in the form of a laminated or safety glass plate consisting of an inner glass plate 1*a* and an outer glass plate 1*b*, which are connected by a plastic film 12 inserted between them. The annular body 3 with the elastomer facing 4 is inserted in a boring 2 that runs through the plate 1*a*. The construction illustrated in FIG. 7 differs from the structure described above, apart from the additional glass plate 1*b* and the film 12, in terms of the external realization of the annular body 3. While in the embodiment illustrated in FIG. 4, the annular body 3 extends in the form of a ring-shaped cylinder to the outside of the plate and the facing 4 and ends flush with the latter, as in FIGS. 1A and 4A, this ring-shaped cylindrical part is lacking on the outside of the annular body 3. The facing 4, on the other hand, has a circular-shaped step 4*a* in the form of a recess, into which a circular cover plate 13, preferably made of stainless steel, is inserted. From the outside through the plate 1*b*, the observer, as illustrated in FIG. 9, sees only a narrow ring of the rubber facing 4 and the cover plate 13 located in the middle, but not the annular body 3 and the screwed-in threaded bolt 6. The annular body 3 is also set back with respect to the circular step 4*a*, so that when there is a movement of the punctiform holder, there will be no damage to the plastic film 12 or to the outer glass plate 1*b*.

Figure 8:
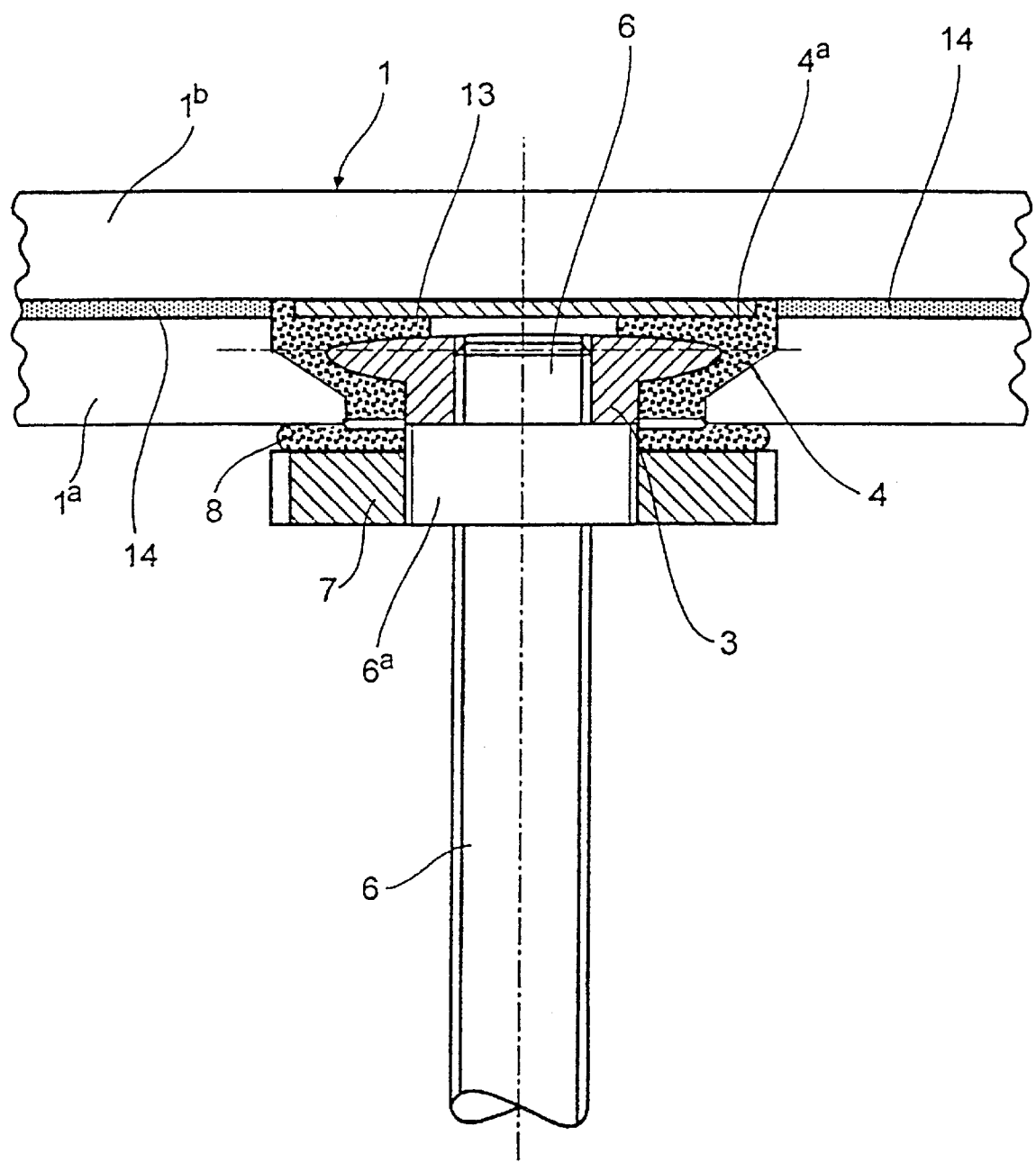
FIG. 8 shows an axial section of a punctiform holder in a laminated glass plate in an embodiment that is modified with respect to the one illustrated in FIG. 7.
Figure 10:
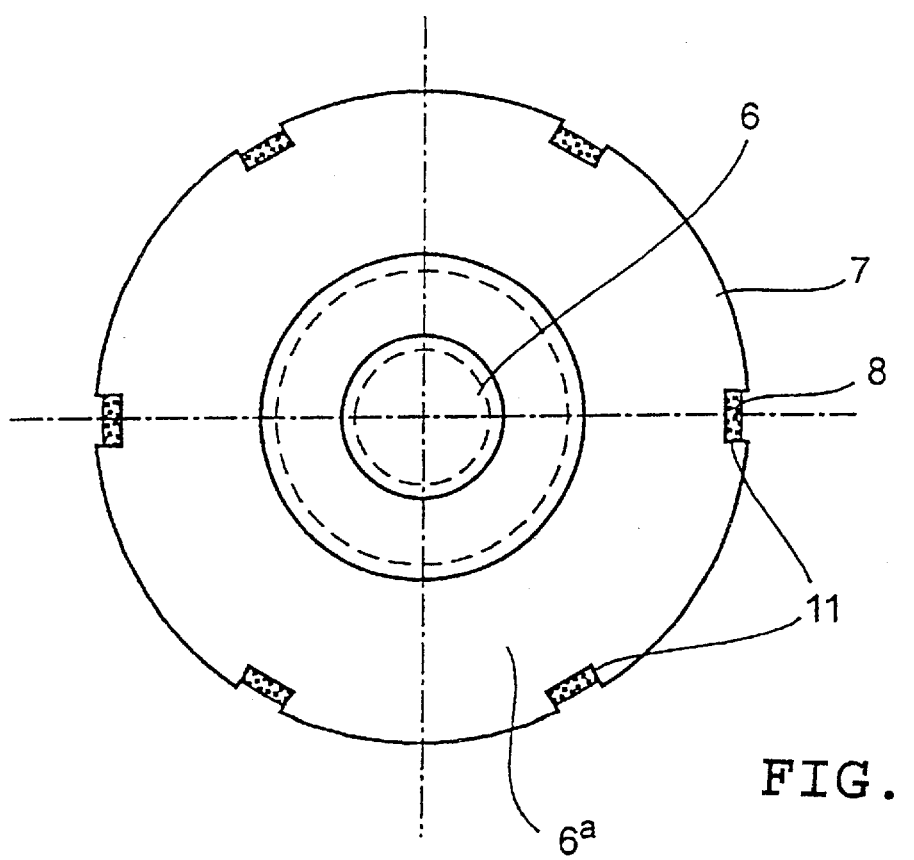
FIG. 10 shows a view from underneath of the punctiform holder illustrated in FIG. 7.

In the embodiment of the punctiform holder illustrated in FIG. 8, the elastic facing has a slightly larger axial dimension on the outside toward the glass panel 1*b* than in the embodiment illustrated in FIG. 7. The facing 4 runs through to the outer plate 1*b*. The plates 1*a* and 1*b* are connected by a layer of synthetic resin, which is not present, however, in the vicinity of the elastomer facing 4. FIGS. 9 and 10 are respectively a view from overhead and underneath of the punctiform holder illustrated in FIGS. 7 and 8.

Figure 11:
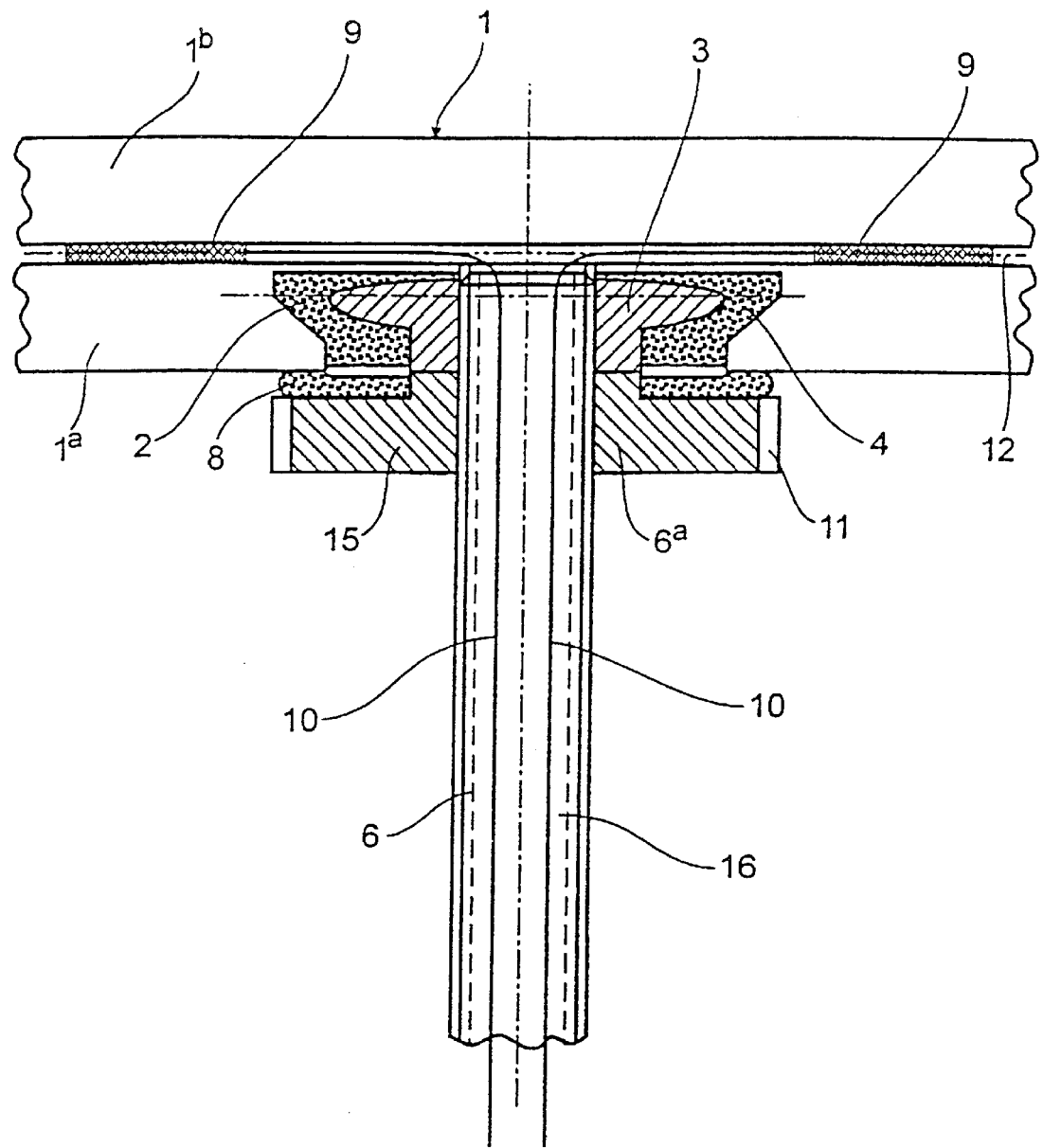
FIG. 11 shows an axial section through a punctiform holder with photovoltaic elements and conductors routed through the punctiform holder.

In a further configuration of the teaching of the invention, FIG. 11 shows a punctiform holder of the type described above with the use of a solar module.

Solar cells are embedded in the plastic film 12 between the glass panels 1*a* and 1*b*. The solar cells 9 have connecting lines 10. To conduct the connecting lines 10 from the solar cells to a converter, the threaded bolt 6 is provided with a boring 16, through which the connecting lines 10 are led out of the solar module. In this exemplary embodiment, too, the annular body 3 with its elastomer facing ring 4 is embedded inside the glass panel 1*a*. The solar module is therefore hermetically shielded externally by the glass panel 1*b*. The annular body 3 is fastened over or by means of the threaded bolt 6 and the threaded bolt 6 is fastened with the lock nut 15 described above against an exterior shoulder of the annular body 3. In this case, too, an elastomer ring 8 is inserted between the outside of the glass panel 1*a* and the contact surface of the lock nut 15. With this type of punctiform fastening element, care can be taken as early as during the design process that the connecting lines 10 can run through the annular body 3 with its facing 4, which is embedded inside the boring 2 of the glass panel 1*a*. Examples of further variations of the solar module design and arrangement that may be used in or with other embodiments of the present invention can be found in U.S. patent application Ser. No. 09/498,385, having attorney docket No. NHL-DOR-68 US, having inventor Hubert ELMER, filed on Feb. 3, 2000, and entitled, "Attachment device for a glass pane at a mounting fixed to a structure", which application is incorporated by reference herein.

The punctiform holders described above are characterized by their very simple structure, low manufacturing costs and ease of installation. All possible relative movements between the plate 1 and the bolt 6 or the load-bearing structure connected with it can be absorbed, within certain limits. In the exemplary embodiments illustrated in the accompanying figures, this capability is achieved by an elastomer ring-shaped profile which is vulcanized on the inside to the metal annular body 3, and on the outside is in contact with the wall of the hole in the plate.

In one possible embodiment of the invention, the invention relates to a punctiform fastening device for plates, in particular glass plates and solar modules.

Figure 12:
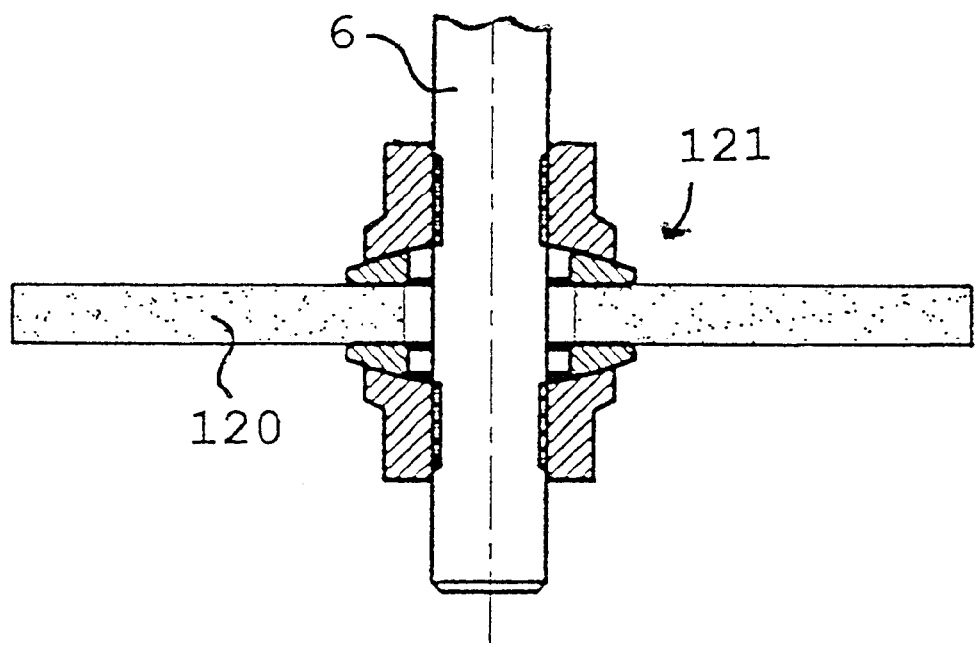
FIG. 12 shows the bolt or pin mounted with a mounting device in a building structure or other mounting structure.

FIG. 12 shows the bolt or pin 6 mounted with a mounting device 121 in a building structure 120 or other mounting structure.

Figure 13:
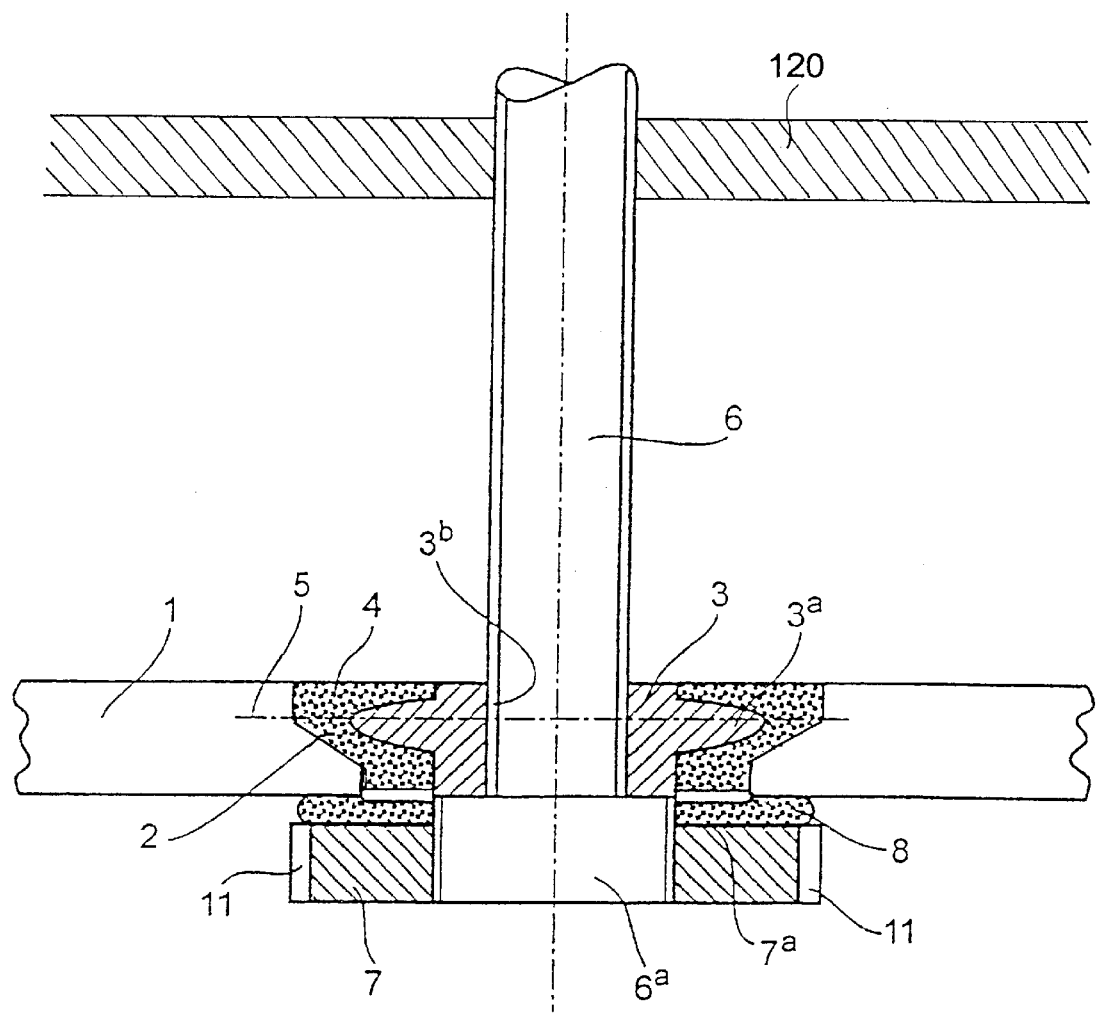
FIG. 13 shows the fastening device shown in FIG. 1 mounted to a building structure or other mounting structure.

FIG. 13 shows the fastening device shown in FIG. 1 mounted to a building structure 120 or other mounting structure.

Figure 14:
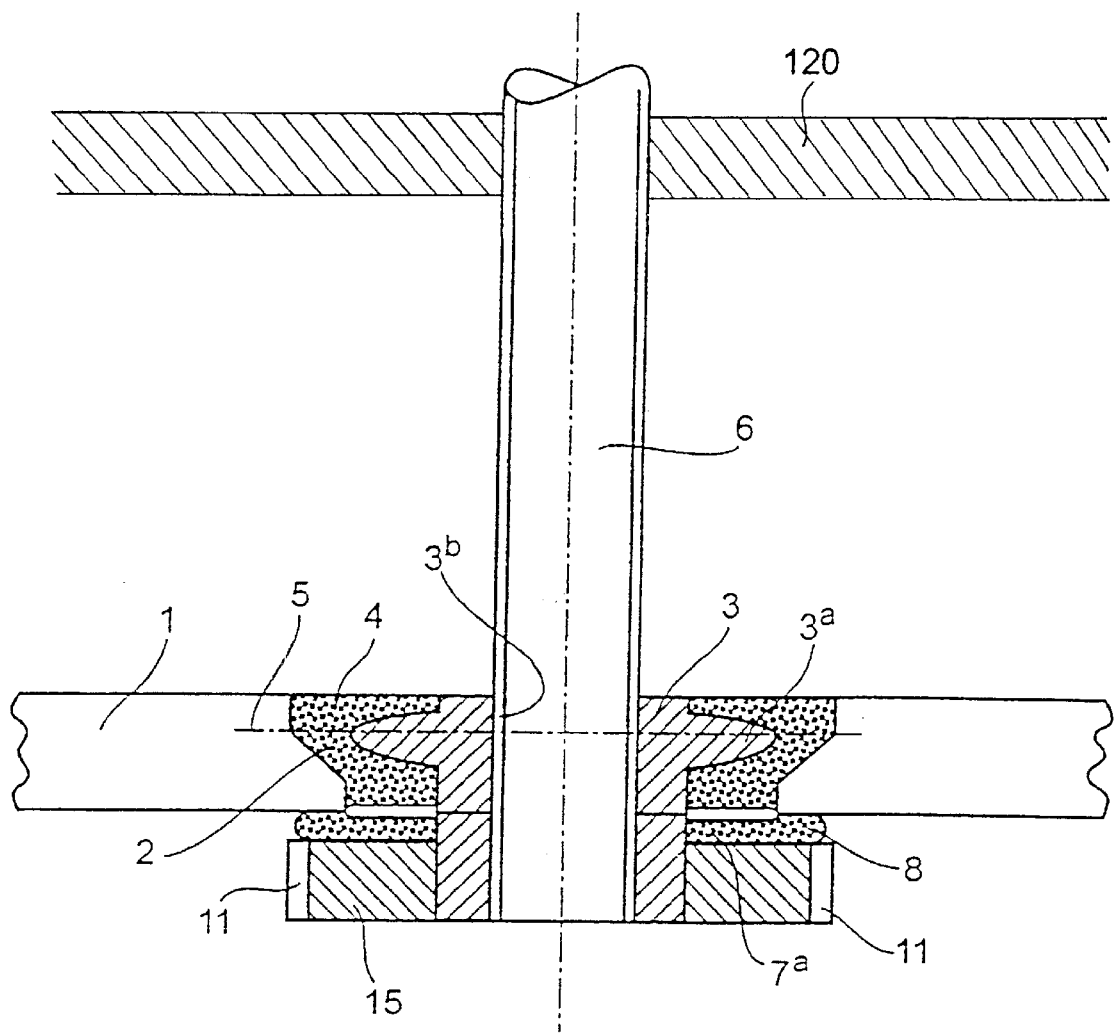
FIG. 14 shows the fastening device shown in FIG. 1A mounted to a building structure or other mounting structure.
Figure 15:
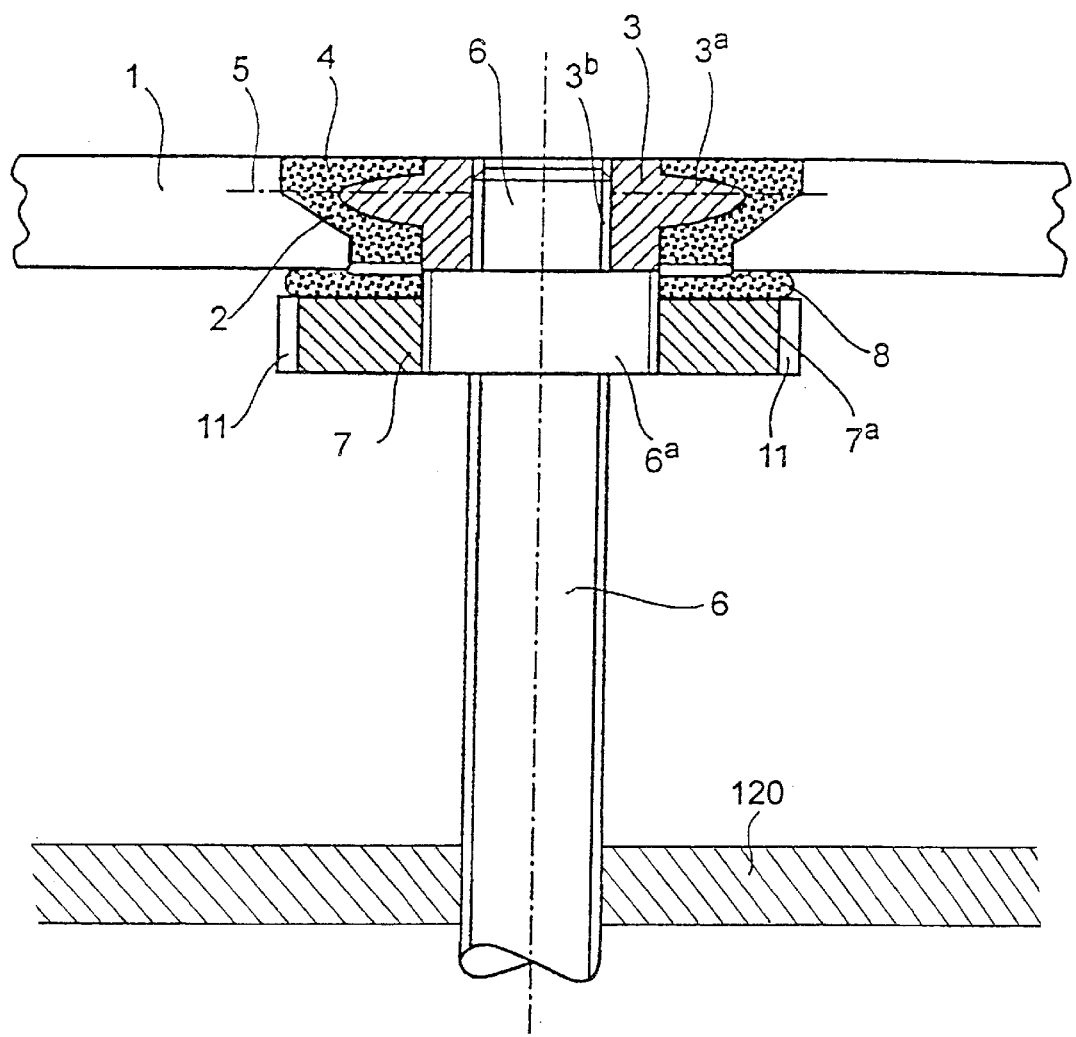
FIG. 15 shows the fastening device shown in FIG. 4 mounted to a building structure or other mounting structure.
Figure 16:
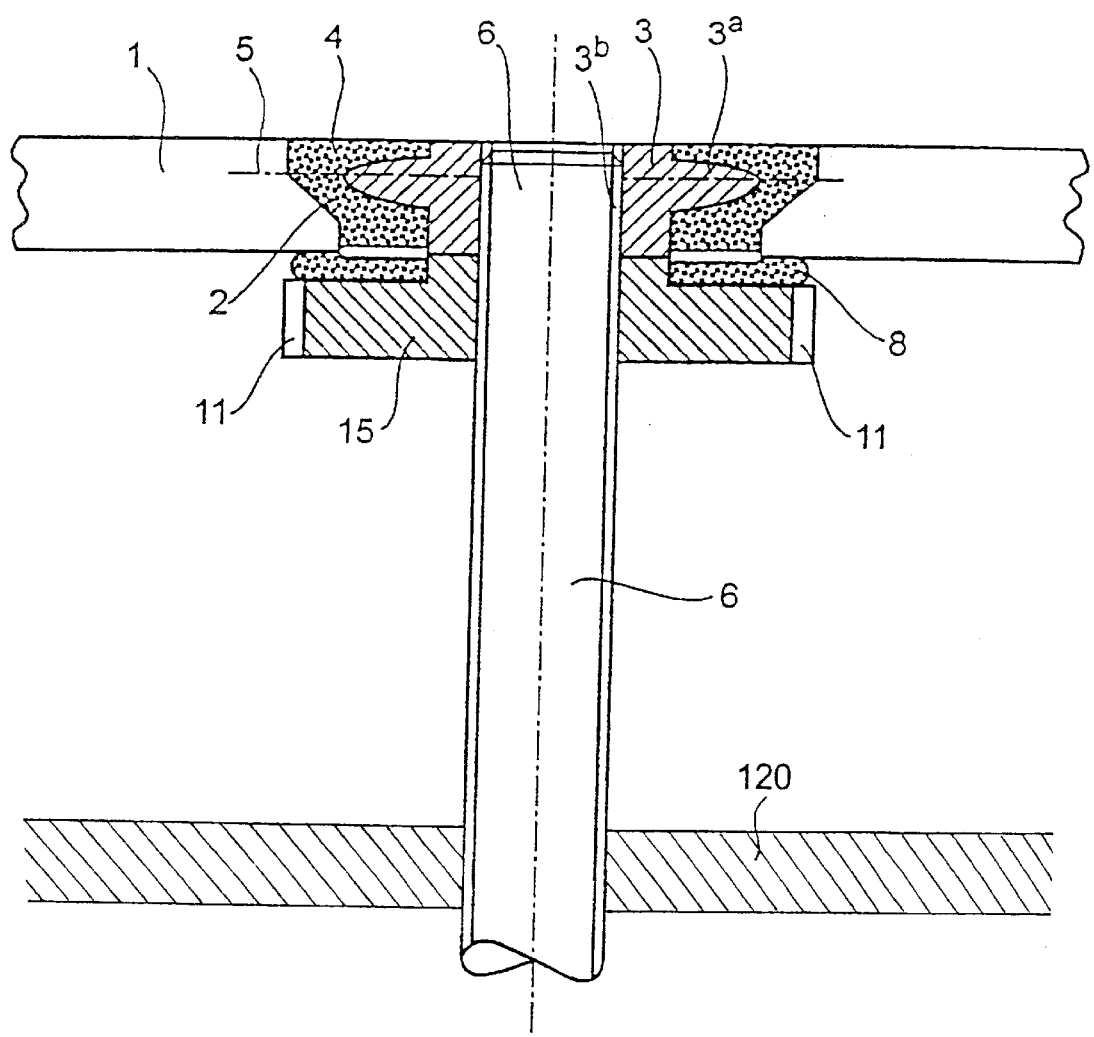
FIG. 16 shows the fastening device shown in FIG. 4A mounted to a building structure or other mounting structure.
Figure 17:
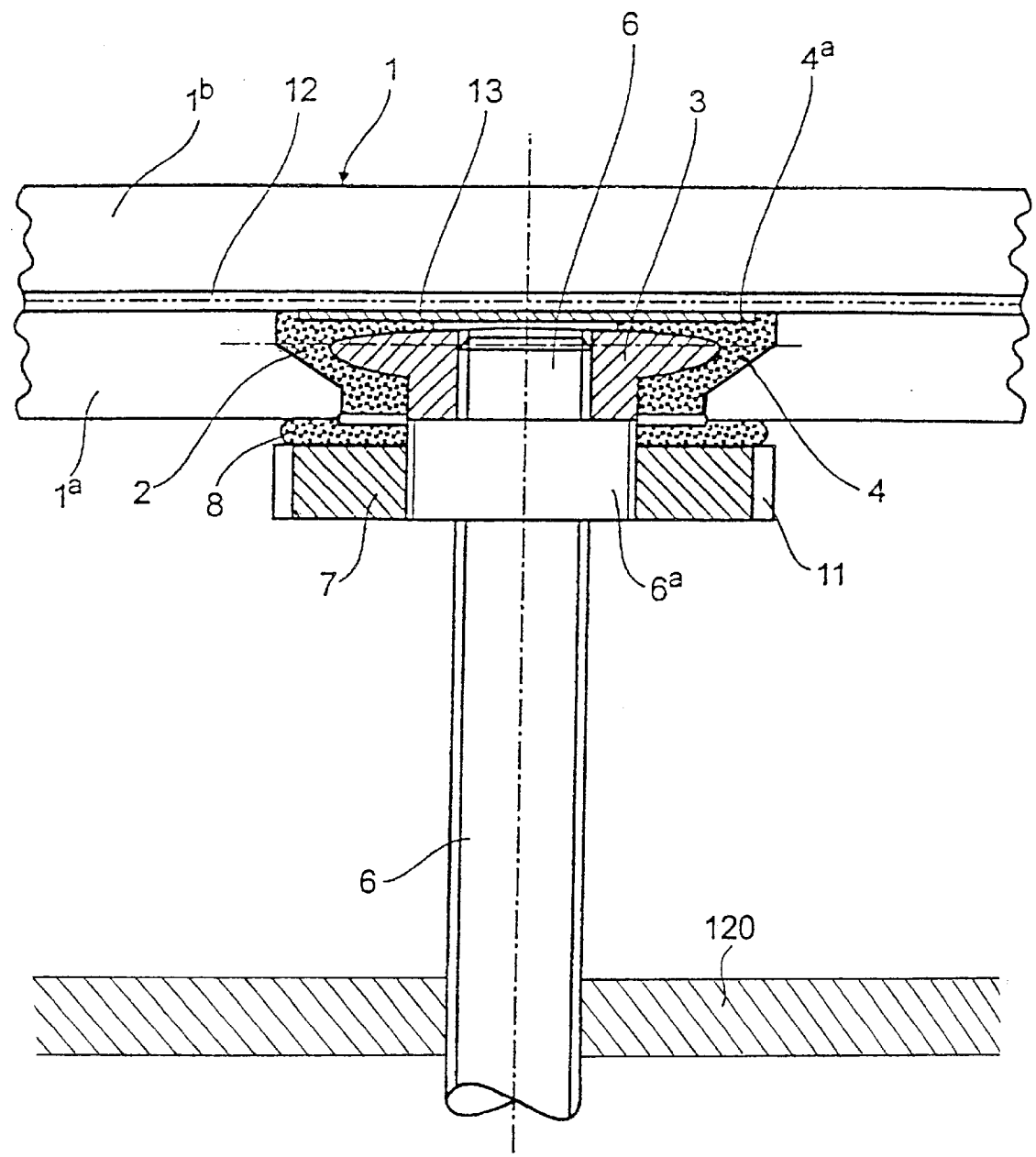
FIG. 17 shows the fastening device shown in FIG. 7 mounted to a building structure or other mounting structure.
Figure 18:
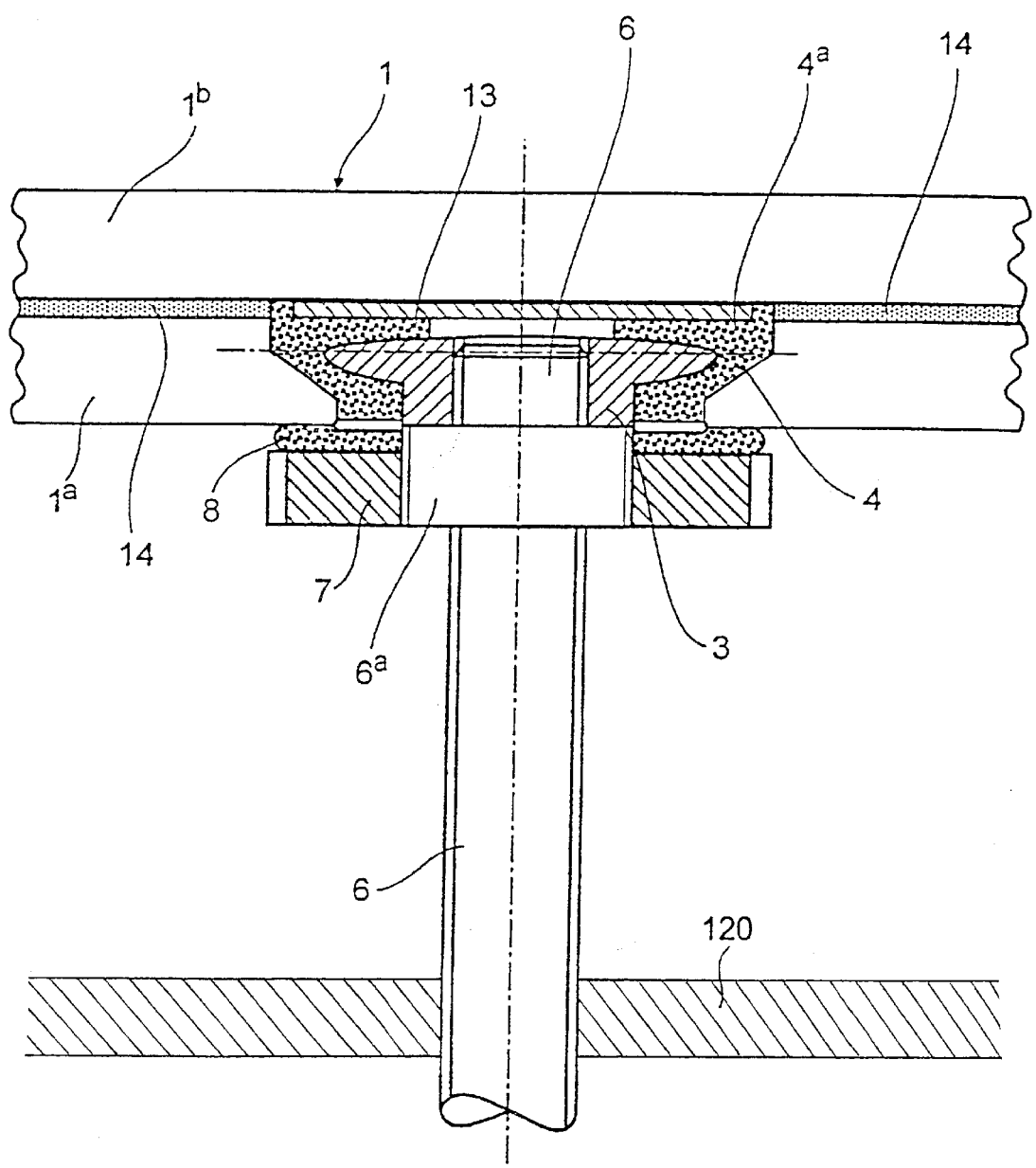
FIG. 18 shows the fastening device shown in FIG. 8 mounted to a building structure or other mounting structure.
Figure 19:
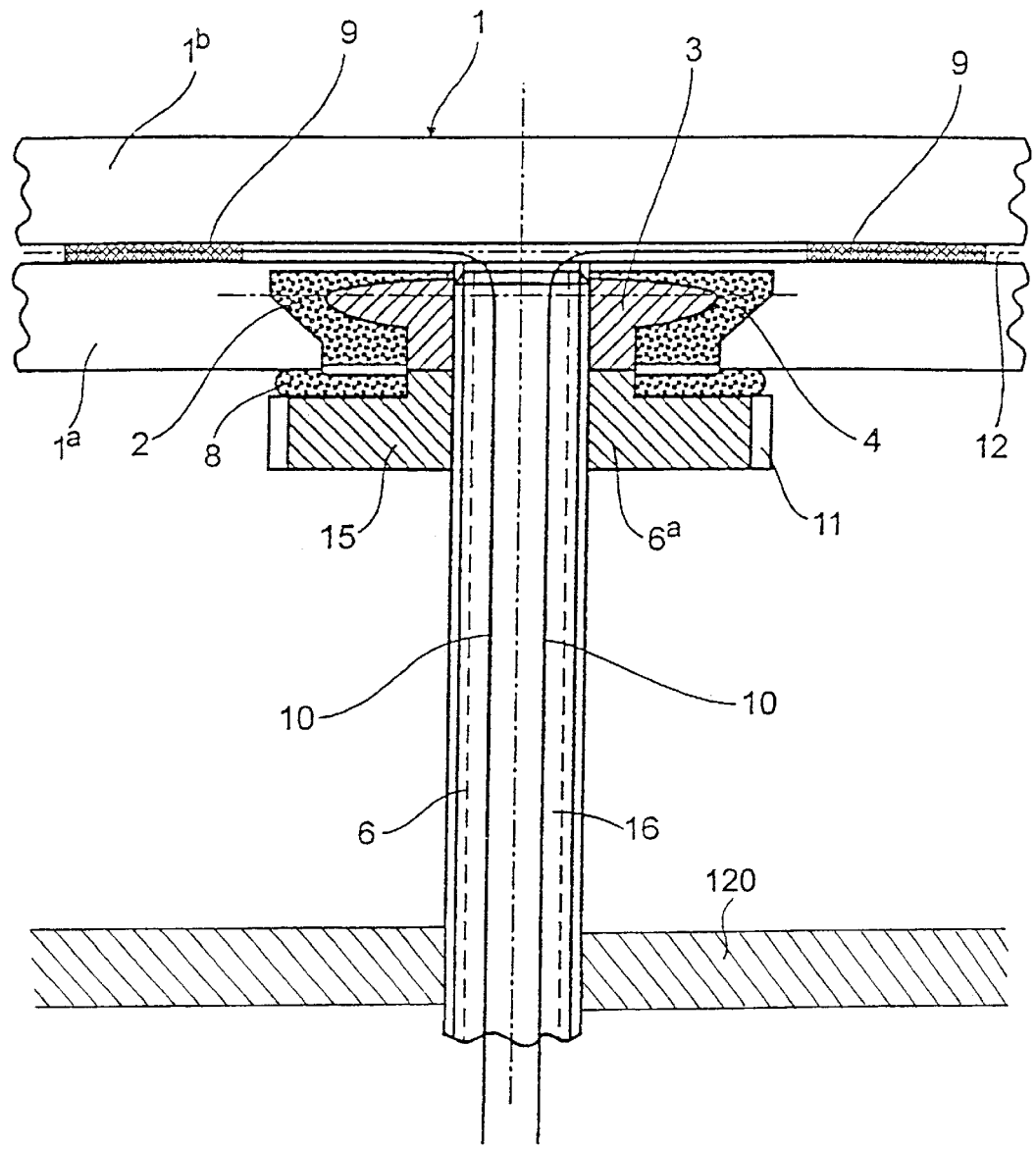
FIG. 19 shows the fastening device shown in FIG. 11 mounted to a building structure or other mounting structure.
Figure 20:
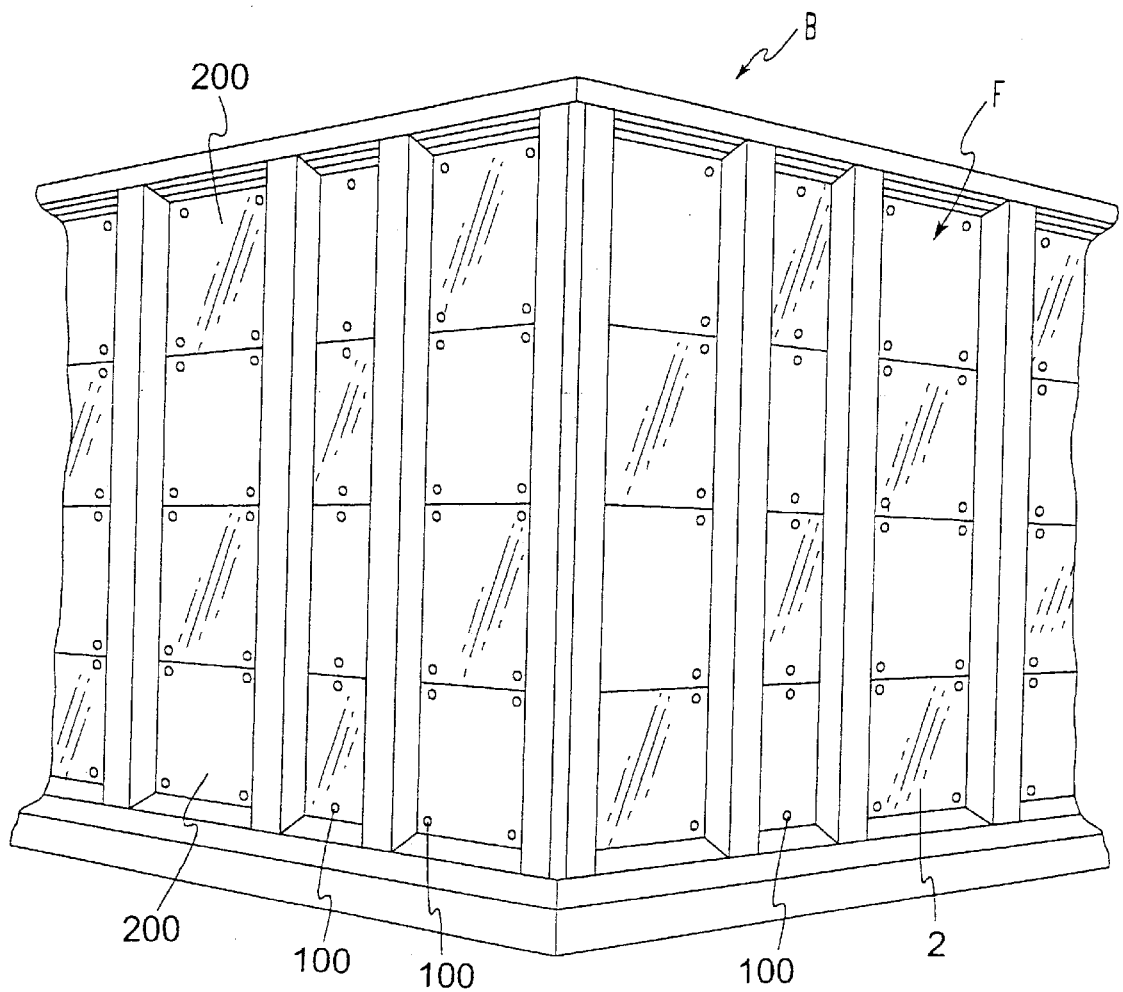
FIG. 20 shows a perspective view of a building with a glass facade.

FIG. 14 shows the fastening device shown in FIG. 1A mounted to a building structure 120 or other mounting structure;

FIG. 15 shows the fastening device shown in FIG. 4 mounted to a building structure 120 or other mounting structure;

FIG. 16 shows the fastening device shown in FIG. 4A mounted to a building structure 120 or other mounting structure;

FIG. 17 shows the fastening device shown in FIG. 7 mounted to a building structure 120 or other mounting structure;

FIG. 18 shows the fastening device shown in FIG. 8 mounted to a building structure 120 or other mounting structure;

FIG. 19 shows the fastening device shown in FIG. 11 mounted to a building structure 120 or other mounting structure;

FIG. 20 shows a perspective view of a building B with a glass facade F composed of glass panels 200 which are held in place by fastening devices 100 in accordance with at least one embodiment of the present invention.

Figure 21:
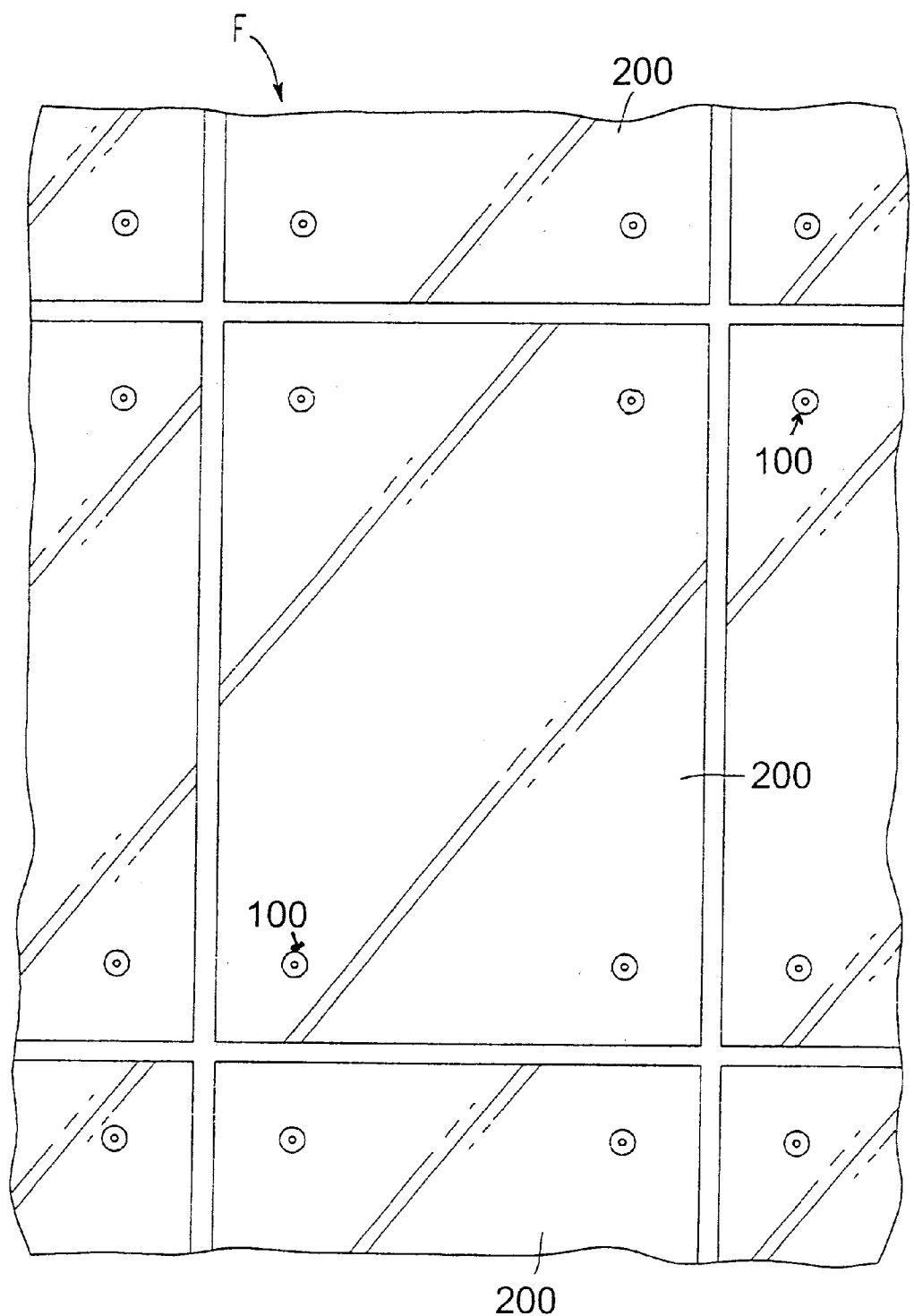
FIG. 21 shows an elevation of a part of a building face or facade with glass panels.

FIG. 21 shows an elevation of a part of a building facade F with glass panels (200) which are held in place by fastening devices (100) in accordance with at least one embodiment of the present invention.

One feature of the invention resides broadly in a fastening device for plates, in particular glass plates (1), to a building-side mounting, whereby the glass plates (1) have borings (2) all the way through, characterized by the fact that inserted in each boring there is at least one metal annular body (3) with an internal or female thread (3b) and an outside facing (4) made of an elastic material positively and non-positively connected with the annular body (3), and a threaded pin (6) for the connection to a load-bearing construction can be screwed into the annular body (3).

Another feature of the invention resides broadly in a fastening device characterized by the fact that a nut (7, 15) that is engaged beyond the boring (2) is screwed onto the threaded bolt (2).

Yet another feature of the invention resides broadly in a fastening device characterized by the fact that a projection (3a) that is embedded in the facing (4) is realized on the annular body (3).

Still another feature of the invention resides broadly in a fastening device characterized by the fact that an oval ring-shaped projection (3a) is realized on the annular body (3).

A further feature of the invention resides broadly in a fastening device characterized by the fact that the projection (3a) is asymmetrical with reference to a radial plane (5).

Another feature of the invention resides broadly in a fastening device characterized by the fact that the outside of the annular body (3) has an outer and an inner cylindrical area, between which there is at least one projection (3a).

Yet another feature of the invention resides broadly in a fastening device characterized by the fact that the boring (2) is at least partly tapered.

Still another feature of the invention resides broadly in a fastening device characterized by the fact that the largest outside diameter of the annular body (3) is larger than the smallest diameter of the boring (2).

A further feature of the invention resides broadly in a fastening device characterized by the fact that the facing (4) is vulcanized onto the annular object (3).

Another feature of the invention resides broadly in a fastening device characterized by the fact that the boring (2) and the outside of the facing (4) have a cylindrical-conical-cylindrical profile.

Yet another feature of the invention resides broadly in a fastening device for laminated glass plates (1) consisting of an inner glass plate (1a) and an outer glass plate (1b) which are connected by a plastic film (12) or a synthetic resin layer (14) between them, characterized by the fact that the punctiform holder extends only through the inner glass plate (1a) or the inner and the outer glass plate (1a) and (1b).

Still another feature of the invention resides broadly in a fastening device characterized by the fact that there is a ring (8) made of elastic material between the nut (7) on the one hand and the facing (4) and the plate (1, 1a) on the other hand.

A further feature of the invention resides broadly in a fastening device characterized by the fact that the elastic facing (4) has, on the outside, a recess (4a) into which a cover plate (13) is inserted.

Another feature of the invention resides broadly in a fastening device characterized by the fact that the annular body (3) is set back with respect to the circular recess (4).

Yet another feature of the invention resides broadly in a fastening device characterized by the fact that solar cells (9) are embedded between the inner glass plate (1a) and the outer glass plate (1b) in the vicinity of the plastic film (12), the connecting lines (10) for which run through the annular body (3) that is provided with the facing (4) and/or through a boring (16) in the threaded bolt (6).

The features disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Federal Republic of Germany Patent Application No. 299 17 488.3, filed on Oct. 4, 1999, having inventors Alfons OBERHOFER and Lothar GINZEL, and DE-OS 299 17 488.3 and DE-PS 299 17 488.3, and International Application No. PCT/EP00/09531, filed on Sep. 29, 2000, as well as their published equivalents, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein. All the patents, patent applications and publications anywhere in the present application, such as the references and documents cited in any of the documents cited herein are hereby incorporated by reference as if set forth in their entirety herein.

The following U.S. patents and patent applications are hereby incorporated by reference as if set forth in their entirety herein: U.S. Pat. No. 6,131,346, having attorney docket No. NHL-DOR-54 US, having inventor Herbert KORDES, issued on Oct. 17, 2000 and entitled, "Clamping fitting to attach glass panes"; U.S. Pat. No. 6,158,177, having attorney docket No. NHL-DOR-48 US, having inventor Ernst Udo BLOBAUM, issued on Dec. 12, 2000 and entitled, "Clamping mounting for glass plates, and a kit to construct a clamping mounting to mount glass plates, and a method to utilize a kit to construct a clamping mounting to mount glass plates"; U.S. Design Patent No. 439,135, having attorney docket No. NHL-DOR-74-DES US, having inventor Hubert ELMER, issued on Mar. 20, 2001 and entitled, "Bracket for hanging decorative panels"; U.S. patent application Ser. No. 09/730,083, having attorney docket No. NHL-DOR-79 US, having inventors Hubert ELMER and Peter LEITGEB, filed on Dec. 5, 2000 and entitled, "Building glass facade of a building, clamping arrangement in a facade, and a clamping arrangement for clamping a building glass pane in a facade"; U.S. patent application Ser. No. 09/731,265, having attorney docket No. NHL-DOR-83 US, having inventors Ernst Udo BLOBAUM and Reinhard JANUTTA, filed on Dec. 6, 2000, and entitled, "Building glass facade of a building, a clamping arrangement for holding glass panels in a glass facade of a building, a brace to hold safety glass panels in a glass facade of a building, and a brace to hold safety glass panels"; U.S. patent application Ser. No. 09/498,385, having attorney docket No. NHL-DOR-68 US, having inventor Hubert ELMER, filed on Feb. 3, 2000, and entitled, "Attachment device for a glass pane at a mounting fixed to a structure"; U.S. patent application Ser. No. 09/854,411, having attorney docket No. NHL-DOR-91 US, having inventor Hubert ELMER, filed on May 11, 2001, and entitled, "A glass display case being held together by clamping fittings and a clamping fitting for the corner connection of three adjoining walls, especially glass panes in glass display cases, and a method for using a kit to make a glass display case"; U.S. patent application Ser. No. 09/835,865, having attorney docket No. NHL-DOR-92 US, having inventors Ralf KREYENBORG, Dirk SCHULTE, and Ernst Udo BLOBAUM, filed on Apr. 16, 2001, and entitled, "Clamping fitting for fastening glass plates"; U.S. patent application Ser. No. 09/838,349, having attorney docket No. NHL-DOR-93 US, having inventor Lothar GINZEL, filed on Apr. 19, 2001 and entitled, "An attachment device for mounting a glass pane fixedly to a structure, such as a building and a facade having attachment devices for mounting glass panes fixedly to a structure, such as a building"; U.S. patent application Ser. No. 09/861,458, having attorney docket No. NHL-DOR-94 US, having inventor Hubert ELMER, filed on May 18, 2001, and entitled, "Fastening device with multiple holders for holding a glass panel, a plurality of glass panels, such as a building facade, held together by fastening devices with multiple holders, a method of fastening a facade on a structure, such as a building, with a fastening device with multiple holders"; and U.S. patent application Ser. No. 09/862,031, having attorney docket No. NHL-DOR-96 US, having inventor Hubert ELMER, filed on May 18, 2001, and entitled "Fastening device with a single holder for fastening a glass panel to a building or the like and a plurality of glass panels, such as a building facade, held together by a fastening device with a single holder and a method of fastening a facade on a structure, such as a building, with a fastening device with a single holder."

The details in the patents, patent applications and publications may be considered to be incorporable, at Applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

Some examples of clamping fittings or connectors, features of which may be utilized or adapted for use in at least one possible embodiment of the present invention may be found in the following U.S. Pat. Nos. 4,115,966, having inventor DeLee, issued on Sep. 26, 1978; No. 4,409,906, having inventor Alneng, issued on Oct. 18, 1983; No. 4,731,973, having inventor Stenemann, issued on Mar. 22, 1988; No. 6,131,346, having inventor Kordes, issued on Oct. 17, 2000; No. 6,158,177, having inventor Blöbaum, issued on Dec. 12, 2000; and No. 6,173,545 B1, having inventors Feldpausch et al., issued on Jan. 16, 2001. The aforementioned patents are hereby incorporated by reference as if set forth in their entirety herein.

Some examples of glass mountings and glass mounting devices, features of which may possibly be utilized or adapted for use in at least one embodiment of the present invention may be found in the following U.S. Pat. Nos. 5,373,672, issued to Schulz on Dec. 20, 1994; No. 5,323,577, issued to Whitmyer on Jun. 28, 1994; No. 5,283,978, issued to Horgan, Jr. on Feb. 8, 1994; No. 5,212,922, issued to Werner on May 25, 1993; No. 4,841,679, issued to Hogg et al. on Jun. 27, 1989; No. 4,097,320, issued to Brauer et al. on Jun. 27, 1978; No. 4,054,268, issued to Sher on Oct. 18, 1977 and No. 4,016,690, issued to Richardson on Apr. 12, 1977. The aforementioned patents are hereby incorporated by reference as if set forth in their entirety herein.

Some examples of glass facades and methods of securing glass panels to a facade, features of which may possibly be utilized or adapted for use in at least one embodiment of the present invention may be found in the following U.S. Pat. Nos. 5,791,105, issued to Gangi on Aug. 11, 1998; No. 5,524,404, issued to Lahaye on Jun. 11, 1996; No. 5,301,484, issued to Jansson, on Apr. 12, 1996; No. 5,493,831, issued to Jansson on Feb. 27, 1996; No. 5,373,672, issued to Schulz on Dec. 20, 1994; No. 5,301,484, issued to Jansson on Apr. 12, 1994; No. 5,184,440, issued to Felix et al. on Feb. 9, 1993; No. 5,069,014, issued to Kubbutat on Dec. 3, 1991; No. 4,837,996, issued to Eckelt on Jun. 13, 1989; and No. 4,793,112, issued to Sufke on Dec. 27, 1988. The aforementioned patents are hereby incorporated by reference as if set forth in their entirety herein.

Some examples of facades and structures thereof which may be used with embodiments of the present invention, may be found in the following U.S. Pat. Nos. 3,974,608, issued on Aug. 17, 1976 to Grearson and entitled "Panel wall construction", also referred to above; No. 4,070,835, issued on Jan. 31, 1978 to Reverendi et al. and entitled "Device intended for the hooking of panels on a wall in order to constitute a covering on this wall"; No. 4,167,089, issued on Sep. 11, 1979 to Camus and entitled "Panel assembly and a panel element for a panel assembly"; No. 4,483,122, issued on Nov. 20, 1984 to Crandell and entitled "Replacement panel and method of installing same in a curtain wall"; No. 4,500,572, issued on Feb. 19, 1985 to Francis and entitled "Structural spacer glazing with connecting spacer device"; No. 4,563,849, issued on Jan. 14, 1986 to Mangal and entitled "Device for interlocking together two adjacent metal frames from two different levels"; No. 4,581,868, issued on Apr. 15, 1986 to McCann and entitled "Glass assembly"; No. 4,689,928, issued on Sep. 1, 1987 to Dutton et al. and entitled "Architectural plate glass support system"; No. 4,998,392, issued on Mar. 12, 1991 to Massarelli et al. and entitled "Device for mounting insulating double-glazing onto a fixed frame"; No. 5,014,477, issued on May 14, 1991 to MacDonald and entitled "Building facade"; No. 5,027,567, issued on Jul. 2, 1991 to Roberts and entitled "Structural glass unit"; No. 5,083,405, issued on Jan. 28, 1992 to Miller and entitled "Wall panel mounting system"; No. 5,115,612, issued on May 26, 1992 to Newton et al. and entitled "Transparent thermal pane"; No. 5,184,440, issued on Feb. 9, 1993 to Felix et al. and entitled "Metal framed facade panel and facade covered with such a panel"; No. 5,212,922, issued on May 25, 1993 to Werner and entitled "Kit for glass facades"; No. 5,373,672, issued on Dec. 20, 1994 to Schulz and entitled "Arrangement of mounting sections for the fastening of a pane of glass"; No. 5,802,799, issued on Sep. 8, 1998 to Thuleskär et al. and entitled "Glazing system for buildings"; and No. 6,075,201, issued on Jun. 13, 2000 to Wambach and entitled "Photovoltaic solar module in plate form".

Some examples of safety glass that may be utilized or adapted for use in at least one possible embodiment of the present invention may be found in the following U.S. Pat. Nos. 5,853,835, having inventor Leniton, issued on Dec. 29, 1998; No. 5,049,433, having inventor Leotta, issued on Sep. 17, 1991; No. 5,002,820, having inventors Bolton et al., issued on Mar. 26, 1991; No. 4,668,574, having inventors Bolton et al., issued on May 26, 1987; No. 4,663,228, having inventors Bolton et al., issued on May 5, 1987; No. 4,632,877, having inventors Watanabe et al., issued on Dec. 30, 1986; No. 4,600,653, having inventors Washita et al., issued on Jul. 15, 1986; No. 4,584,245, having inventors Kuga et al., issued on Apr. 22, 1986; No. 4,551,372, having inventor Kunert, issued on Nov. 5, 1985; No. 4,382,996, having inventors Mori et al., issued on May 10, 1983; No. 4,309,484, having inventors Ohmae et al., issued on Jan. 5, 1982; and No. 4,039,719, having inventors Matsuda et al., issued on Aug. 2, 1977. The aforementioned patents are hereby incorporated by reference as if set forth in their entirety herein.

Some examples of insulated or insulating glass that may be utilized or adapted for use in at least one possible embodiment of the present invention may be found in the following U.S. Pat. Nos. 6,138,433, having inventor Ridge, issued on Oct. 31, 2000; No. 6,059,909, having inventors Hartig et al., issued on May 9, 2000; No. 6,038,825, having inventors Shah et al.; No. 6,014,872, having inventors Hartig et al., issued on Jan. 18, 2000; No. 5,763,338, having inventors Asada et al., issued on Jun. 9, 1998; No. 5,705,010, having inventor Larsen, issued on Jan. 6, 1998; No. 5,683,764, having inventor Alts, issued on Nov. 4, 1997; No. 5,679,419, having inventor Larsen, issue on Oct. 21, 1997; No. 5,377,473, having inventors Narayan et al., issued on Jan. 3, 1995; No. 5,313,761, having inventor Leopold, issued on May 24, 1994; and No. 5,270,084, having inventor Parker, issued on Dec. 14, 1993.

Some examples of insulating gases, insulated glass panes filled with an insulating gas other than air, and methods of filling glass panes with insulating gas that may be utilized or adapted for use in at least one possible embodiment of the present invention may be found in the following U.S. Pat. Nos. 5,957,169, having inventor Trpkovski, issued on Sep. 28, 1999; No. 5,762,739, having inventors Lenhardt et al., issued on Jun. 9, 1998; No. 5,704,405, having inventor Lisec, issued on Jan. 6, 1998; No. 5,676,782, having inventor Lisec, issued on Oct. 14, 1997; No. 5,645,678, having inventor Lisec, issued on Jul. 8, 1997; No. 5,626,712, having inventor Lisec, issued on May 6, 1997; No. 5,413,156, having inventor Lisec, issued on May 9, 1995; No. 5,336,574, having inventors Lenhardt et al., issued on Nov. 22, 1994; No. 5,350,469, having inventors Lendhardt et al., issued on Sep. 27, 1994; No. 5,110,337, having inventor Lisec, issued on May 5, 1992; No. 4,921,022, having inventor Lisec, issued on May 1, 1990; No. 4,886,095, having inventor Lisec, issued on Dec. 12, 1989; and No. 4,369,084, having inventor Lisec, issued on Jan. 18, 1983. The aforementioned patents are hereby incorporated by reference as if set forth in their entirety herein.

Some examples of elastic elements and compositions thereof which may be used with embodiments of the present invention, may be found in the following U.S. Pat. Nos. 4,649,685, issued on Mar. 17, 1987 to Wolf, et al. and entitled "Spacer"; No. 4,759,962, issued on Jul. 26, 1988 to Buecken et al. and entitled "Elastomeric sealing gasket assembly and its method of manufacture"; and No. 4,837,996, issued on Jun. 13, 1989 to Eckelt and entitled "Glass facade", also referred to above.

Some examples of brace and glass panels which may possibly be utilized or adapted for use in the context of the present invention may be found in the following U.S. Pat. Nos. and U.S. patent application Ser. Nos. 6,050,036, issued on Apr. 18, 2000 to Frey; No. 5,857,298, issued on Jan. 12, 1999 to Fullwood; No. 5,675,942, issued on Oct. 14, 1997 to Crawford; No. 5,155,958, issued on Oct. 20, 1992 to Huff; No. 4,993,204, issued on Feb. 19, 1991 to Kuritsky, et al; No. 4,641,468, issued on Feb. 10, 1987 to Slater; and No. 4,352,279, issued on Oct. 5, 1982 to Parlebas, et al.

Some examples of vulcanized rubber and/or elastomers bonded to metal or plastic and methods of bonding vulcanized rubber and/or elastomers to metal or plastic, features of which may possibly be utilized or adapted for use in the context of the present invention may be found in the following U.S. Patents: U.S. Pat. No. 4,327,150, entitled, "Method of bonding plasticized elastomer to metal and articles produced thereby," issued to White, et al. on Apr. 27, 1982; U.S. Pat. No. 4,370,283, entitled, "Process for vulcanization of elastomer products," issued to Arimatsu, et al. on Jan. 25, 1983; U.S. Pat. No. 4,382,052, entitled, "Process for vulcanization of elastomer products," issued to Arimatsu on May 3, 1983; U.S. Pat. No. 4,542,070, entitled, "Process for adhering polyurethane elastomer to metal," issued to Ohtani, et al. on Sep. 17, 1985; U.S. Pat. No. 4,639,384, entitled, "Method of casting urethane elastomer on metal," issued to Umemoto, et al. on Jan. 27, 1987; U.S. Pat. No. 4,970,901, entitled, "Method for examining quality of adhesion in vulcanized rubber-adhesively bonded metal part," issued to Takeya, et al. on Nov. 20, 1990; U.S. Pat. No. 5,589,119, entitled, "Silicone elastomer seals for molded plastic parts," issued to Hetherington on Dec. 31, 1996; U.S. Pat. No. 5,647,939, entitled, "Method of bonding a cured elastomer to plastic and metal surfaces," issued to Gee, et al. on Jul. 15, 1997; and U.S. Pat. No. 5,977,489, entitled, "Conductive elastomer for grafting to a metal substance," issued to Crotzer, et al. on Nov. 2, 1999.

This invention as described hereinabove in the context of the preferred embodiments is not to be taken as limited to all of the provided details thereof, since modifications and variations thereof may be made without departing from the spirit and scope of the invention.

AT LEAST PARTIAL NOMENCLATURE

1. Glass plate
1a Inner glass plate
1b Outer glass plate
2 Boring
3 Annular body
3a Oval ring-shaped projection
3b Threaded boring
4 Facing
4a Recess
5 Radial plane (tip circle plate)
6 Threaded bolt
6a Head
7 Nut
7a Outside
8 Ring
9 Solar cell 10 Connecting line
11 Recess
12 Plastic film
13 Cover plate
14 Casting resin
15 Lock nut
16 Boring

What is claimed is:

1. A glass facade for a building, said glass facade comprising:

at least one glass plate;
said at least one glass plate comprising a first glass plate;
said first glass plate comprising at least one hole;
said at least one hole comprising a first hole;
at least one fastening arrangement;
said at least one fastening arrangement comprising a first fastening arrangement;
said first hole being configured and disposed to receive said first fastening arrangement to hold said first glass plate;
said first fastening arrangement being configured and disposed to attach said first glass plate to a building or other structure;
said first fastening arrangement comprising:
  at least one rigid annular body;
  said at least one rigid annular body comprising a first rigid annular body;
  said first rigid annular body comprising an internal, female thread;
  an elongated member having a first end and a second end opposite said first end;
  said first end of said elongated member comprising an external thread;
  said internal thread of said first rigid annular body being engaged with said external thread of said first end of said elongated member;
  said second end of said elongated member being configured to be connected to a building structure;
  an elastic member;
  said elastic member being disposed around and connected to said first rigid annular body;
  said elastic member being configured and disposed to contact the interior of said first hole and be held against the interior of said first hole by said first rigid annular body; and
  said elastic member being configured and disposed to permit relative pivoting of said elongated member and said first glass plate to:
    compensate for forces on said first glass plate, the forces comprising at least one of wind, snow, rain, heat, and cold; and
    permit adjustment of said first glass plate during installation on a building structure to position said first glass plate with respect to the building structure;
  said external thread of said first end of said elongated member comprises a first portion and a second portion;
  said first portion is disposed within said first hole in said first glass plate;
  said second portion is disposed to extend out and away from said first glass plate;
  a nut being engaged with said second portion of said external thread of said elongated member;
  said first rigid annular body comprises a projection;
  said projection is configured and disposed to be embedded in said elastic member;
  said elongated member has a center longitudinal axis;
  said projection comprises an oval ring-shaped projection; said ring-shaped projection has a radial plane disposed substantially through the middle of the ring-shaped projection and substantially perpendicular to said center longitudinal axis; and
  said ring-shaped projection is asymmetrical with respect to said radial plane.

2. The glass facade according to claim 1, wherein:
said annular body has an outer cylindrical surface;
said outer cylindrical surface comprises a first portion and second portion; and
said ring-shaped projection is disposed between said first portion and said second portion of said outer cylindrical surface.

3. The glass facade according to claim 2, wherein:
said ring-shaped projection of said first rigid annular body has a diameter disposed along said radial plane;
said first hole comprises a first cylindrical portion, a tapered portion, and a second cylindrical portion;
said tapered portion is disposed between said first cylindrical portion and said second cylindrical portion of said first hole;
said first cylindrical portion has a larger diameter than said second cylindrical portion of said first hole; and
the diameter of said ring-shaped projection is larger than the diameter of said second cylindrical portion of said first hole.

4. The glass facade according to claim 3, wherein:
said elastic member is vulcanized onto said first rigid annular body; and
said first hole and said elastic member each have a cylindrical-conical-cylindrical cross-sectional profile.

5. The glass facade according to claim wherein:
said at least one glass plate comprises a second glass plate;
said first glass plate and said second glass plate are laminated; and
said first glass plate and said second glass plate are connected by one of: a plastic film and a synthetic resin layer disposed between said glass plates.

6. The glass facade according to claim 5, wherein:
said first fastening arrangement comprises an elastic ring; and
said elastic ring is disposed between said nut and said elastic member and between said nut and said first glass plate.

7. The glass facade according to claim 6, wherein:
said first glass pane comprises a first surface and a second surface disposed opposite said first surface;
said elastic member comprises a first surface and a second surface disposed opposite said first surface;
said first surface of said elastic member being disposed to lie substantially on a plane with said first surface of said first glass plane;
said first surface of said elastic member comprises a recess; and
said fastening arrangement comprises a cover plate configured and disposed to be inserted into said recess.

8. The glass facade according to claim 7, wherein:

said first rigid annular body is disposed a distance from said recess;

said glass facade comprises solar cells disposed between said first glass plate and said second glass plate adjacent one of: said plastic film and said synthetic resin layer;

said solar cells comprise connecting lines;

said elongated member comprises a longitudinal boring; and said connecting lines are configured and disposed to run through at least one of: said first rigid annular body and said longitudinal boring in said elongated member.

9. A fastening arrangement configured to fasten a glass plate to a building structure, said fastening arrangement comprising:

at least one rigid annular body;

said at least one rigid annular body comprising a first rigid annular body;

said first rigid annular body comprising an internal, female thread;

an elongated member having a first end and a second end opposite said first end;

said first end of said elongated member comprising an external thread;

said internal thread of said first rigid annular body being configured to receive and be engaged with said external thread of said first end of said elongated member;

said second end of said elongated member being configured to be connected to a building structure;

an elastic member;

said elastic member being disposed around and connected to said first rigid annular body;

said elastic member being configured to be disposed to contact the interior of a hole in a glass plate and be held against the interior of the hole by said first rigid annular body;

said elastic member being configured to permit relative pivoting of said elongated member and a glass plate to:
compensate for forces on the glass plate, the forces comprising at least one of wind, snow, rain, heat, and cold; and
permit adjustment of the glass plate during installation on a building structure to position the glass plate with respect to the building structure;

said external thread of said first end of said elongated member comprises a first portion and a second portion;

said first portion is configured to be disposed within a hole in a glass plate;

said second portion is configured to be disposed to extend out and away from a first glass plate;

a nut being configured to be engaged with said second portion of said external thread of said elongated member;

said first rigid annular body comprises a projection;

said projection is configured and disposed to be embedded in said elastic member;

said elongated member has a center longitudinal axis;

said projection comprises an oval ring-shaped projection;

said ring-shaped projection has a radial plane disposed substantially through the middle of the ring-shaped projection and substantially perpendicular to said center longitudinal axis; and said ring-shaped projection is asymmetrical with respect to said radial plane.

10. The fastening arrangement according to claim 9, wherein:

said annular body has an outer cylindrical surface;

said outer cylindrical surface comprises a first portion and second portion; and said ring-shaped projection is disposed between said first portion and said second portion of said outer cylindrical surface.

11. The fastening arrangement according to claim 10, wherein:

said ring-shaped projection of said first rigid annular body has a diameter disposed along said radial plane;

the diameter of said ring-shaped projection is configured to be smaller than a first diameter of a partly-tapered hole in a glass plate and larger than a second diameter of the partly-tapered hole in the glass plate;

said elastic member is vulcanized onto said first rigid annular body; and said elastic member has a cylindrical-conical-cylindrical cross-sectional profile configured to match a cylindrical-conical-cylindrical profile of a hole in a glass plate.

12. The fastening arrangement according to claim 11, wherein:

said fastening arrangement further comprises an elastic ring; and said elastic ring is configured to be disposed between said nut and said elastic member and between said nut and a glass plate.

13. The fastening arrangement according to claim 12, wherein:

said elastic member comprises a first surface and a second surface disposed opposite said first surface;

said first surface of said elastic member is configured to be disposed to lie substantially on a plane with a first surface of a glass plane;

said first surface of said elastic member comprises a recess;

said fastening arrangement comprises a cover plate configured to be inserted into said recess;

said first rigid annular body is disposed a distance from said recess;

said elongated member comprises a longitudinal boring configured to receive a connecting line from a solar cell in a glass plate arrangement; and said first rigid annular body is configured to receive a connecting line from a solar cell in a glass plate arrangement.

* * * * *

UNITED STATES PATENT AND TRADEMARK OFFICE
CERTIFICATE OF CORRECTION

PATENT NO. : 6,735,921 B2
DATED : May 18, 2004
INVENTOR(S) : Alfons Oberhofer and Lothar Ginzel It is certified that error appears in the above-identified patent and that said Letters Patent is hereby corrected as shown below:

Column 5,
Line 35, (ending in "which:") insert the following paragraph:

-- Figure 1 shows an axial section through a punctiform holder for a single glass plate with an external fastening connnection: --.

Column 10,
Lines 50 and 65, after "Udo", delete "BLOBAUM," and insert -- BLÖBAUM, --.

Column 11,
Line 17, before "filed", delete "BLOBAUM," and insert -- BLÖBAUM, --.

Column 12,
Line 29, after "to", delete "Sufke" and insert -- Süfke --.

Column 14,
Line 7, after "U.S.", delete "patent application Ser. Nos." and insert -- Patent Applications: No. --.

Column 16,
Line 40, after "claim" insert -- 4, --.

Signed and Sealed this

Twenty-sixth Day of October, 2004

JON W. DUDAS
*Director of the United States Patent and Trademark Office*